US006532213B1

United States Patent
Chiussi et al.

(10) Patent No.: US 6,532,213 B1
(45) Date of Patent: Mar. 11, 2003

(54) GUARANTEEING DATA TRANSFER DELAYS IN DATA PACKET NETWORKS USING EARLIEST DEADLINE FIRST PACKET SCHEDULERS

(75) Inventors: Fabio M. Chiussi, Long Branch, NJ (US); Vijay Sivaraman, Los Angeles, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/312,253

(22) Filed: May 14, 1999

Related U.S. Application Data
(60) Provisional application No. 60/085,547, filed on May 15, 1998.

(51) Int. Cl.[7] .............................................. H04L 12/56
(52) U.S. Cl. .................................. 370/230.1; 370/235.1
(58) Field of Search .............................. 370/389, 395.1, 370/395.4, 412, 413, 417, 235.1, 230.1

(56) References Cited

U.S. PATENT DOCUMENTS

| | | | |
|---|---|---|---|
| 5,796,719 A | * 8/1998 | Perry et al. .................. 370/231 |
| 5,946,297 A | * 8/1999 | Calvignac et al. ........... 370/230 |
| 5,978,356 A | 11/1999 | Elwalid et al. | |
| 6,088,734 A | 7/2000 | Marin et al. | |
| 6,091,708 A | * 7/2000 | Matsunuma ................. 370/233 |
| 6,266,324 B1 | * 7/2001 | Kirino et al. ................ 370/230 |
| 6,269,079 B1 | * 7/2001 | Marin et al. ................. 370/230 |
| 6,324,165 B1 | * 11/2001 | Fan et al. .................... 370/232 |
| 6,349,089 B1 | * 2/2002 | Bonomi et al. ............ 370/230.1 |

* cited by examiner

Primary Examiner—Ken Vanderpuye
(74) Attorney, Agent, or Firm—Steve Mendelsohn; Ian M. Hughes

(57) ABSTRACT

A system is disclosed that services a plurality of queues associated with respective data connections in a packet communication network such that the system guarantees data transfer delays between the data source and the destination of each data connection. This is achieved in two stages. The first stage shapes the traffic of each connection such that it conforms to a specified envelope. The second stage associates timestamps with the packets released by the first stage and chooses for transmission from among them the one with the smallest timestamp. Both stages are associated with a discrete set of delay classes. The first stage employs one shaping structure per delay class. Each shaping structure in turn supports a discrete set of rates and employs a FIFO of connections per supported rate. A connection may move between FIFOs corresponding to different rates as its rate requirement changes. The second stage associates with each packet exiting the first stage a timestamp given by the exit time from the first stage and the delay class to which the connection belongs. A queue of packets is maintained per delay class, and the scheduler selects for transmission from among the packets at the head of the queues the one with the smallest timestamp.

15 Claims, 15 Drawing Sheets

GUARANTEEING DATA TRANSFER DELAYS IN DATA PACKET NETWORKS USING EARLIEST DEADLINE FIRST PACKET SCHEDULERS

CROSS-REFERENCE TO RELATED APPLICATIONS

This application claims the benefit of the filing date of U.S. provisional application No. 60/085,547, filed on May 15, 1998 as attorney docket no. Chiussi 12-1.

FIELD OF THE INVENTION

The present invention relates to a system for scheduling packets in packet networks and, more particularly, to guaranteeing data transfer delays from data sources to destinations.

BACKGROUND

FIG. 1 shows a packet network in which a plurality of switches 2 are connected to each other by communication links 8. A number of data sources 4 and destinations 6 are connected to the communication switches 2. From time to time, a network connection is established or torn down from each of these data sources 4 to a corresponding destination. The connection establishment process involves one of the data sources 4 sending a packet including control information that indicates one of the destinations 6 to which it desires the connection and the desired envelope of the data traffic it agrees to send on the connection, along with the desired delay bounds at each of the communication switches 2 on the path to the destination. The above desired connection and envelope are specified in terms of leaky-bucket parameters as disclosed in R. Cruz, "A Calculus for Network Delay, Part II: Network Analysis," *IEEE Transactions on Information Theory*, pp. 121–141, January 1991. For the tear-down of a connection, the data source sends a packet including control information indicating that the connection needs to be torn down.

When one of the switches 2 in the network receives a data packet indicating that a connection needs to be established, the switch executes a call admission control (CAC) procedure to determine whether or not the delay required by the connection can be guaranteed by the network, If the result of such a procedure in every switch on the path of the connection in the network indicates that the delay can be guaranteed by the network, then the connection is accepted in the network. On the other hand, if the result of such a procedure in at least one of the switches 2 on the path of the connection in the network indicates that the delay cannot be guaranteed by the network, then the connection is not accepted in the network.

The provision of quality-of-service (QoS) guarantees, such as bandwidth, delay, jitter, and cell loss, to applications of widely different characteristics is a primary objective in emerging broadband packet-switched networks. In such networks, packet-scheduling disciplines are necessary to satisfy the QoS requirements of delay-sensitive applications, and they ensure that real-time traffic and best-effort traffic can coexist on the same network infrastructure. Among the scheduling algorithms that have been proposed in literature, two classes of schemes have become popular: those based on generalized processor sharing (GPS) and those based on earliest deadline first (EDF). For a survey of these algorithms, see S. Keshav, *An Engineering Approach to Computer Networking. ATM Networks, the Internet, and the Telephone Network*, Addison-Wesley, Ithaca, N.Y., 1996; H. Zhang, "Service Disciplines for Guaranteed Performance Service in Packet-Switching Networks," *Proceedings of the IEEE*, pp. 1374–1396, October 1995.

EDF scheduling has been known for many years in the context of processor scheduling as disclosed in C. L. Liu and J. W. Wayland, "Scheduling algorithms for multiprogramming in a hard real time environment," *Journal of ACM*, pp. 46–61, January 1973. Furthermore, it has been more recently proposed as a possible packet-scheduling discipline for broadband networks as disclosed in D. Ferrari and D. Verma, "A Scheme for Real-Time Channel Establishment in Wide-Area Networks," *IEEE Jour. Sel. Areas Commun.*, pp. 368–379, April 1990; D. Verma, H. Zhang, D. Ferrari, "Guaranteeing Delay Jitter Bounds in Packet Switching Networks," *Proc. TRICOMM*, pp. 35–46, Chapel Hill, N.C., October 1991. The EDF scheduling discipline generally works as follows: each connection i at a switch k is associated with a local delay deadline $d_i^k$; then an incoming packet of connection i arriving to the scheduler at time t is stamped with a deadline $t+d_i^k$, and packets in the scheduler are served by increasing order of their deadline.

For a single switch, EDF is known to be the optimal scheduling policy as disclosed in L. Georgiadis, R. Guerin, and A. Parekh, "Optimal Multiplexing on a Single Link: Delay and Buffer Requirements," RC 19711 (97393), *IBM T. J.*, Watson Research Center, August 1994; J. Liebeherr, D. Wrege, and D. Ferrari, "Exact Admission Control for Networks with a Bounded Delay Service," *IEEE/ACM Trans. Networking*, pp. 885–901, December 1996. Optimality is defined in terms of the schedulable region associated with the scheduling policy. Given N connections with traffic envelopes $\overline{A}_i(t)$ (i=1, 2, ..., N) sharing an output link, and given a vector of delay bounds $\vec{D}=(d_1, d_2, \ldots, d_N)$, where $d_i$ is an upper bound on the scheduling delay that packets of connection i can tolerate, the schedulable region of a scheduling discipline $\pi$ is defined as the set of all vectors $\vec{D}$ that are schedulable under $\pi$. EDF has the largest schedulable region of all scheduling disciplines, and its non-preemptive version (NPEDF) has the largest schedulable region of all the non-preemptive policies. The schedulable region of the NPEDF policy consists of those vectors that satisfy the following constraints:

$$\frac{L}{r} \le d_1 \tag{1}$$

$$L + \sum_{i=1}^{N} \overline{A}_i(t-d_i) \le rt, \ \frac{L}{r} \le t \le d_N \tag{2}$$

$$\sum_{i=1}^{N} \overline{A}_i(t-d_i) \le rt, \ t \ge d_N \tag{3}$$

where $d_1 \le d_2 \le \ldots \le d_N$, L is the packet size (if the packet size is variable, then L is the maximum packet size), r is the link rate, and $\overline{A}_i(t)=0$ for $t<0$. Within a single node, once the traffic envelopes are known, a 100% link utilization can be achieved (at least in principle) with this characterization.

The difficulties arise in a multi-switch or multi-node network where the traffic envelopes are no longer determined at the inputs of the nodes inside the network, and the interactions that distort the traffic are not easily characterizable. This problem is not peculiar of EDF, but is common to any scheduling discipline. As a general framework to handle the multi-node problem, H. Zhang and D. Ferrari, "Rate-Controlled Service Disciplines," *Jour. High Speed*

*Networks*, pp. 389–412, 1994, propose a class of schemes called rate-controlled service (RCS) disciplines which reshape the traffic at each hop within the network. As schematically shown in FIG. 2, an RCS server 10 has two components: a shaper 12 which reshapes the traffic of each connection and a scheduler 14 which receives packets released by the shaper and schedules them according to a specific scheduling discipline, such as EDF as disclosed in L. Georgiadis, R. Guerin, V. Peris, and K. Sivarajan, "Efficient Network QoS Provisioning Based on per Node Traffic Shaping," *IEEE/ACM Trans. Networking*, pp. 482–501, August 1996 ("Georgiadis et al."), who build upon this model and derive expressions for the end-to-end delay bounds in terms of the shaper envelope and scheduling delay at each node. They also show the following useful properties of RCS.

Identical shapers at each switch along the path of a connection i (i.e., shapers having identical shaper envelopes for connection i) produce end-to-end delays that are no worse than those produced by different shapers at each switch. Therefore, for any given connection, identical shapers can be used at each node. This shaper envelope common to all shapers for connection i is denoted as $\overline{E}_i(t)$.

The end-to-end delay bound for connection i is given by:

$$\overline{D}_i = D(\overline{A}_i \| \overline{E}_i) + \sum_{k=1}^{k_i} d_i^k \quad (4)$$

where $\overline{D}_i = D(\overline{A}_i \| \overline{E}_i)$ denotes the maximum shaper delay, and $d_i^k$ is the bound on the scheduler delay for packets of connection i at the k-th switch on its path. The maximum shaper delay is incurred only once and is independent of the number of nodes on the path. The total scheduler delay is the sum of the individual scheduling delays $d_i^k$ at each node. When EDF scheduling is used together with per-node reshaping (this combination is referred to as RC-EDF), and the delay components in Equation (4) are properly chosen, the same delay bounds as GPS can be achieved.

The above properties combined with Equations (1–3) enable a call admission control (CAC) framework that decides if connections may or may not enter the network while ensuring that end-to-end performance constraints are met. How CAC works is first analyzed for an isolated EDF scheduler, and then the analysis proceeds to the multi-node case.

In a single switch, Equations (2) and (3) immediately lead to a CAC scheme. With RC-EDF, given the traffic envelope $\overline{E}_i(t)$ (enforced by the shaper) and local delay bound for each of the connections being multiplexed on a link of the switch, the equations are combined into:

$$L + \sum_{i=1}^{N} \overline{E}_i(t - d_i) \le rt, \, t \ge \frac{L}{r} \quad (5)$$

where $d_i \ge L/r$, i=1,2, ... N.

Equation (5) can be graphically interpreted to yield a simple single-switch CAC scheme. $\overline{E}_i(t-d_i)$ is the curve obtained by shifting the connection i arrival envelope curve $\overline{E}_i(t)$ to the right by its delay bound $d_i$, and denotes the minimal service $\hat{S}_i(t)$ required by connection i in order to meet its local delay bound. The aggregate service demand of all connections at the scheduler is thus given by $$S(t) = L + \sum_{i=1}^{N} \hat{S}_i(t)$$

where the term L accounts for the non-preemptive nature of the scheduler). If the aggregate service demand service $\hat{S}(t)$ never exceeds the server capacity given by R(t)=rt for t≥L/r, the packets can be scheduled such that none misses its deadline. FIG. 3 illustrates the service capacity and service demand curves for a simple example with two leaky-bucket constrained connections. Since the following relationship, $S(t)=L+\overline{E}_1(t-d_1)+\overline{E}_2(t-d_2) \le R(t)$ holds for all t≥L/r, the two calls can be admitted with guaranteed delay bounds $d_1$ and $d_2$.

The extension of this scheme to the multi-node case is as follows. For an incoming connection i with traffic arrival envelope at the edge of the network $\overline{A}_i(t)$ and end-to-end delay requirement $d_i$, the end-to-end CAC algorithm performs the following steps to determine if the connection can be accommodated in the network:

1. It chooses an appropriate shaper with envelope $\overline{E}_i(t)$ for the connection, and computes the corresponding delay $D(\overline{A}_i \| \overline{E}_i)$. The delay computation is described in Georgiadis et al.
2. The k-th switch on the path is assigned a delay bound $d_i^k$ such that $$D(\overline{A}_i \| \overline{E}_i) + \sum_{k} d_i^k = \overline{D}_i \cdot A$$

single-node schedulability check according to the schedulability criterion of Equation (5) is performed (using envelope $\overline{E}_i(t)$ and delay bound $d_i^k$) at each switch on the path.

3. The connection is admitted only if every switch on the path can accommodate the connection.

The results in Georgiadis et al. can be used for choosing the shaper envelope and for splitting the total scheduling delay among the schedulers on the path. For leaky-bucket-constrained sources with traffic arrival envelope $\overline{A}_i(t)=\sigma_i+\rho_i t$, generalized processor sharing performance can be matched by choosing shaper envelope $\overline{E}_i(t)=(L+g_i t, \sigma_i+\rho_i t)$, and assigning local delay bound $d_i^k=L/g_i+L/r^k$, to the k-th switch on the path, where $r^k$ is the link rate and $g_i$ is the rate allocated to the connection at each switch.

A potentially serious problem is that the implementation of an RC-EDF server, which consists of a traffic shaper and an EDF scheduler, can be quite complex. Without techniques to reduce this complexity, the scheme would be unaffordable in practice for application to current packet switches.

SUMMARY OF THE INVENTION

It is an object of the present invention to provide a method and an apparatus to implement a EDF-related packet server of minimum complexity, comprising a shaper and a scheduler, which guarantees a small value of the maximum data transfer delay, to each connection.

The EDF-related packet server (alternately called the RC-EDF server) provides a shaper and a scheduler. In accordance with a first aspect of the invention, the shaper holds and releases packets such that the traffic belonging to each connection exiting the shaper conforms to a pre-specified envelope, while the scheduler at each-scheduling instant selects from among the packets released by the shaper the one to be transmitted next on the outgoing link.

To reduce the implementation complexity of both the shaper and the scheduler, the RC-EDF server supports a (relatively small) discrete set of delay classes. Each delay class is associated with a delay value, and this delay value corresponds to the delay guarantee provided by the scheduler to the packets of each connection contained in the delay class.

The shaper provides one shaping structure per delay class (each of such structures is referred to as delay class shaper), each of which shapes all connections corresponding to a specific delay class. Each delay class shaper supports a discrete number of shaping rates, each of which is associated with a first-in-first-out (FIFO) queue. Each shaping rate corresponds to a possible value of the slope corresponding to a piece of a piecewise-linear envelope. Each connection which has at least one packet in the shaper is associated with exactly one of the above-mentioned FIFO queues. The delay class shaper has a two-level hierarchical structure. The lower level of the hierarchy uses FIFO queues, one per rate. At the higher level of the hierarchy, the timestamps associated with each FIFO queue are used to select from among the different FIFO queues for that delay class. Based on the timestamps, the delay-class shaper selects one FIFO queue and sends the first packet of the connection at the head of the selected FIFO to the scheduler.

The scheduler maintains a queue of packets for each delay class. Each packet is associated with a timestamp derived from its release time by the shaper and the delay bounds guaranteed to the connection. A sorter selects from among the packets at the head of the FIFOs the one with the minimum timestamp for transmission on the outgoing link.

In accordance with another aspect of the invention, the EDF-related packet server provides a different shaper from the embodiment according to the first aspect of the invention. The scheduler is identical to the embodiment according to the first aspect of the invention. The shaper provides one shaping structure per delay class (referred to as delay class shaper), each of which shapes all connections corresponding to the delay class. Each delay class shaper supports a discrete number of shaping rates, each of which is associated with a FIFO queue. Each connection that has at least one packet in the shaper could be associated with a multiplicity of the FIFO queues. This is in contrast to the first aspect of the invention where each connection with at least one packet in the shaper is associated with exactly one FIFO queue. The delay class shaper has a two-level hierarchical structure. The lower level of the hierarchy uses FIFO queues, one per rate. At the higher level of the hierarchy, the timestamps associated with each FIFO queue are used to select from among the different FIFO queues for that delay class.

These and other aspects of the invention will become apparent in the ensuing detailed description taken in conjunction with the accompanying figures, which disclose a number of preferred embodiments of the invention.

DETAILED DESCRIPTION OF PREFERRED EMBODIMENTS

Figure 1:
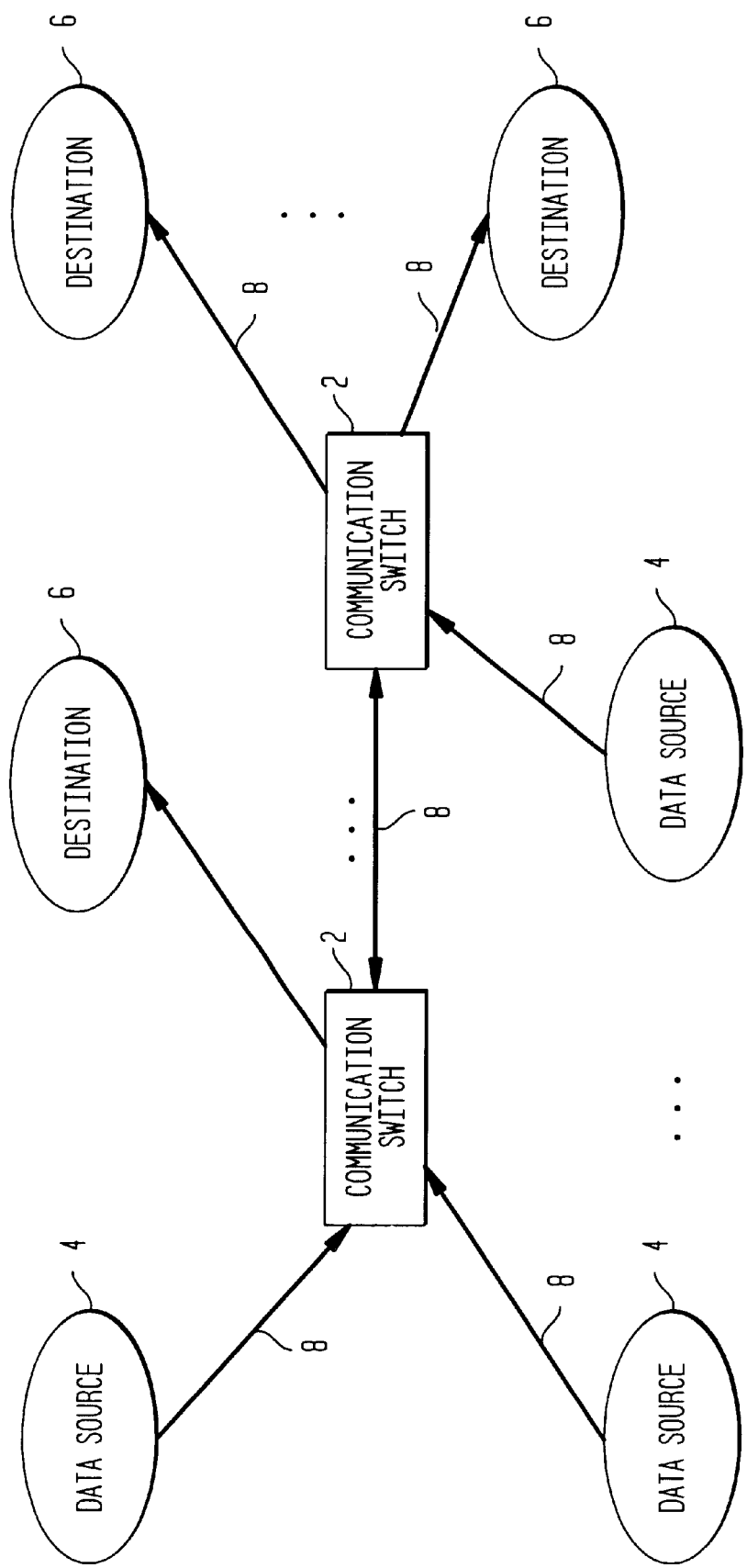
FIG. 1 illustrates a packet network in which a number of switches, data sources, and destinations are connected.
Figure 2:
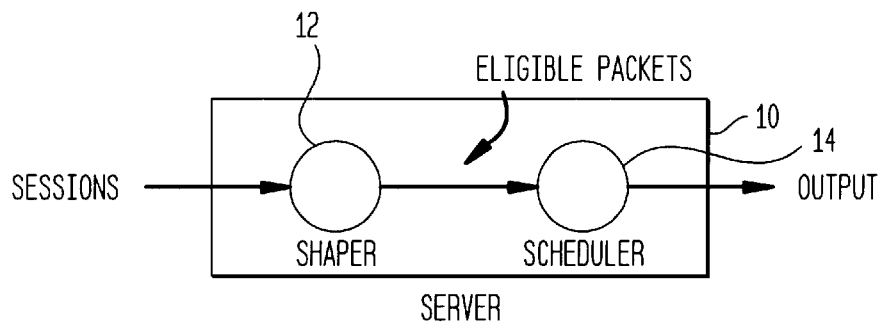
FIG. 2 shows a schematic of the rate controlled service (RCS) discipline server illustrating the concept of traffic reshaping at each switch in the data network.
Figure 3:
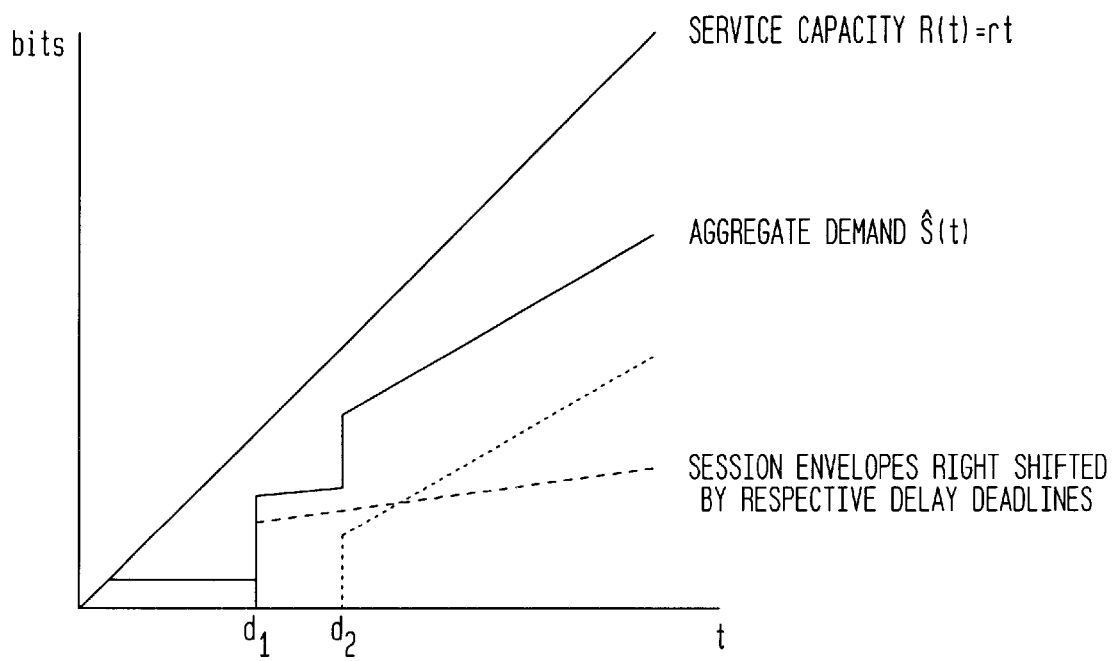
FIG. 3 illustrates an example of the schedulability tests for a single node.
Figure 4:
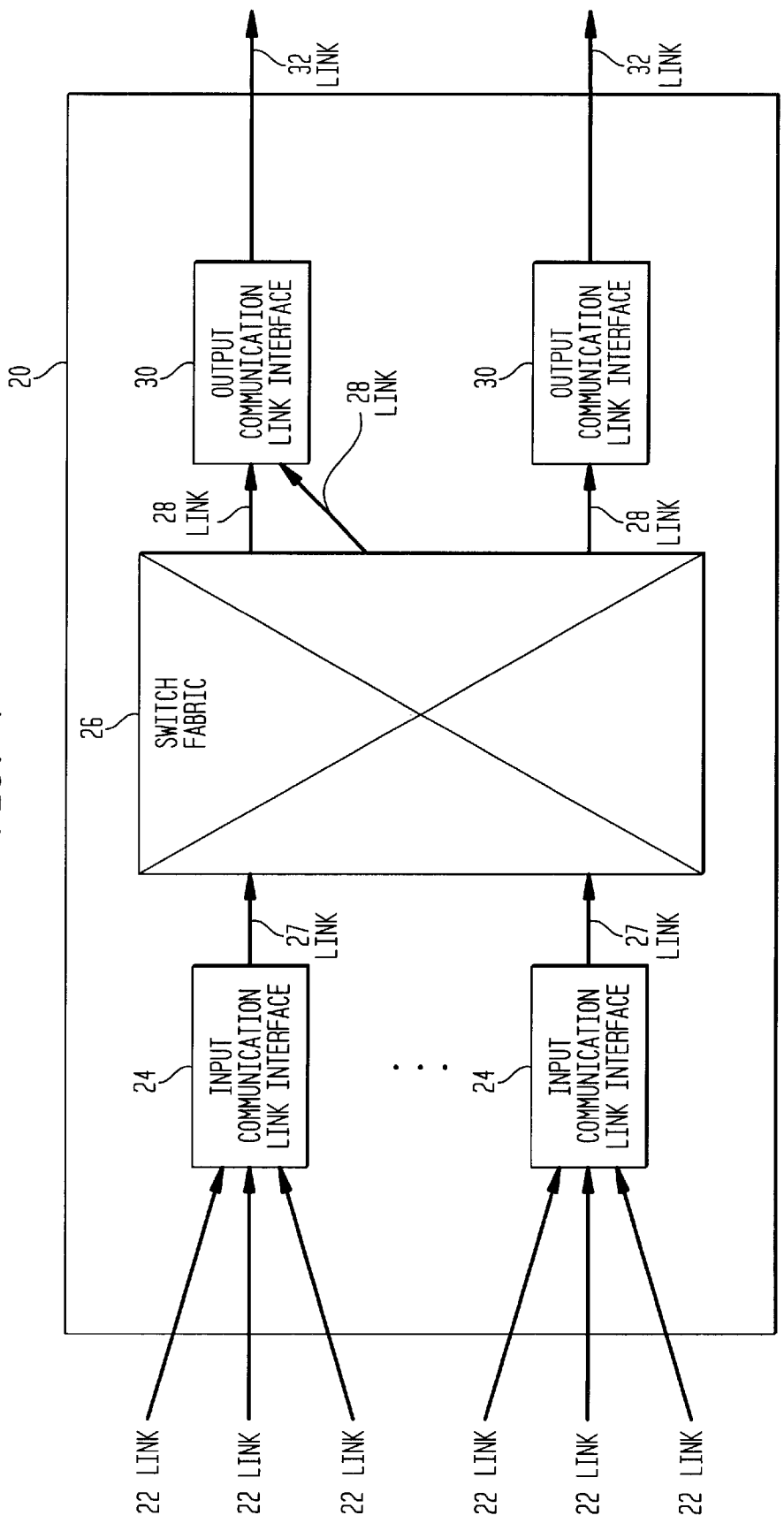
FIG. 4 illustrates a communication switch in the packet network.

FIG. 4 shows a communication switch 20 in a packet network. The communication switch 20 includes a plurality of input communication link interfaces 24, each of which connects a plurality of input links 22 to an output link 27. The output links 27 of these input communication link interfaces 24 serve as inputs to a switch fabric 26. The switch fabric 26 processes the link signals and outputs another set of output links 28 to a plurality of output communication link interfaces 30. The output communication link interfaces 30 output ultimate output link signals 32 of the communication switch 20.

Figure 5:
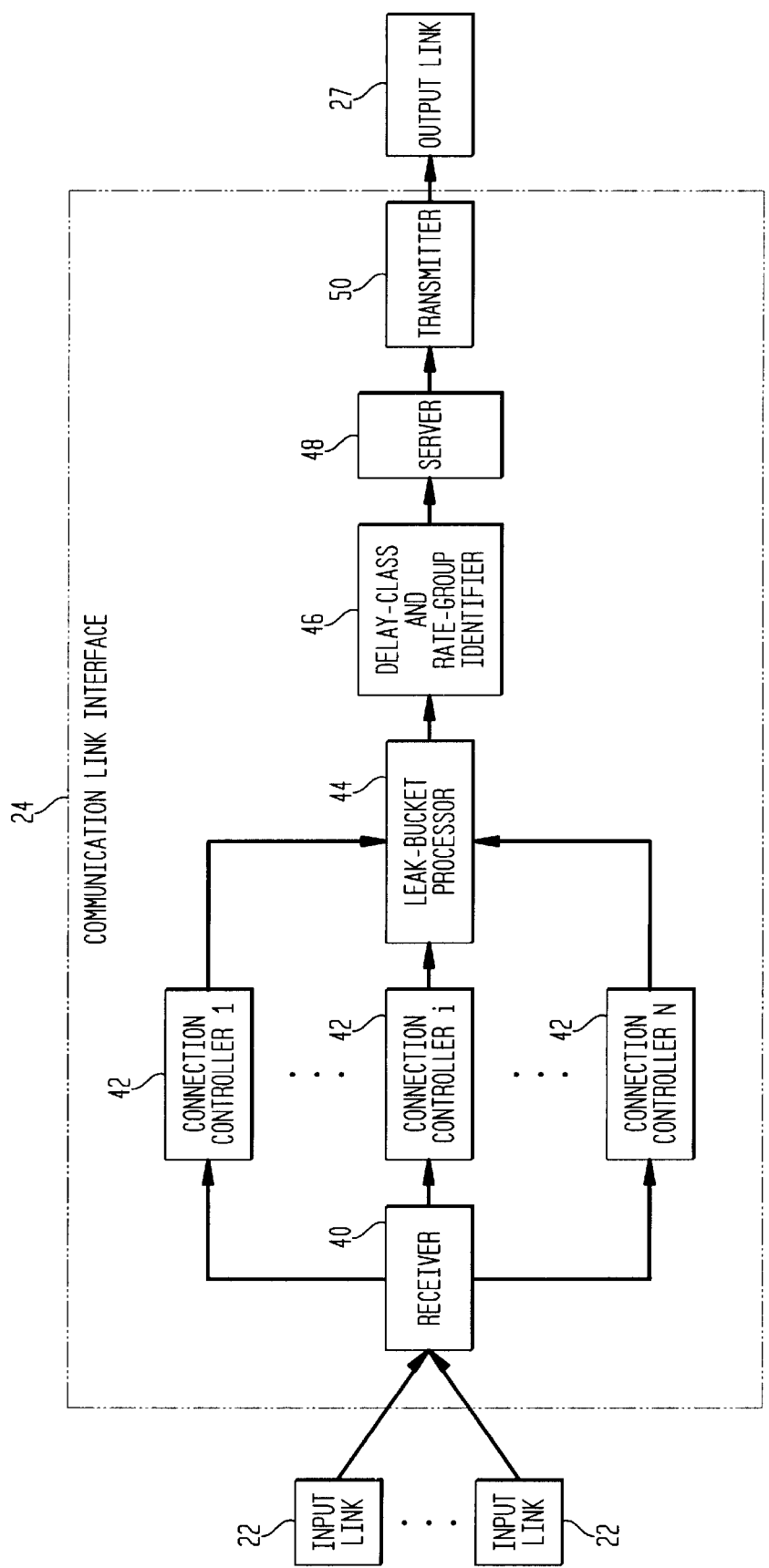
FIG. 5 is a block diagram of the communication link interface according to a first embodiment of the present invention for scheduling the transmission of data packets in a communication link.

FIG. 5 shows a block diagram illustrating a first embodiment of each input communication link interface 24 of FIG. 4 according to the present invention. The input communication link interface 24 includes a data packet receiver 40, which receives the data packets arriving from the input links 22. The receiver 40 uses the contents of the connection identifier field contained in the header of each packet to identify its respective connection i. All packets that the receiver 40 receives have the same length. The receiver 40 thereafter sends each packet to a corresponding connection controller 42. Each connection controller 42 stores a set of information related to a particular connection i. A leaky-bucket processor 44 determines a shaping rate $r_i$ that a particular packet desires. Subsequently, a delay-class and rate-group identifier 46 determines a delay class j to which the connection belongs as well as an index i corresponding to the shaping rate $r_i$. A server 48 groups connections into a discrete set of a relatively small, predetermined number of delay classes. Finally, a transmitter 50 transmits the output of the server 48 to the corresponding output link 27.

Figure 6:
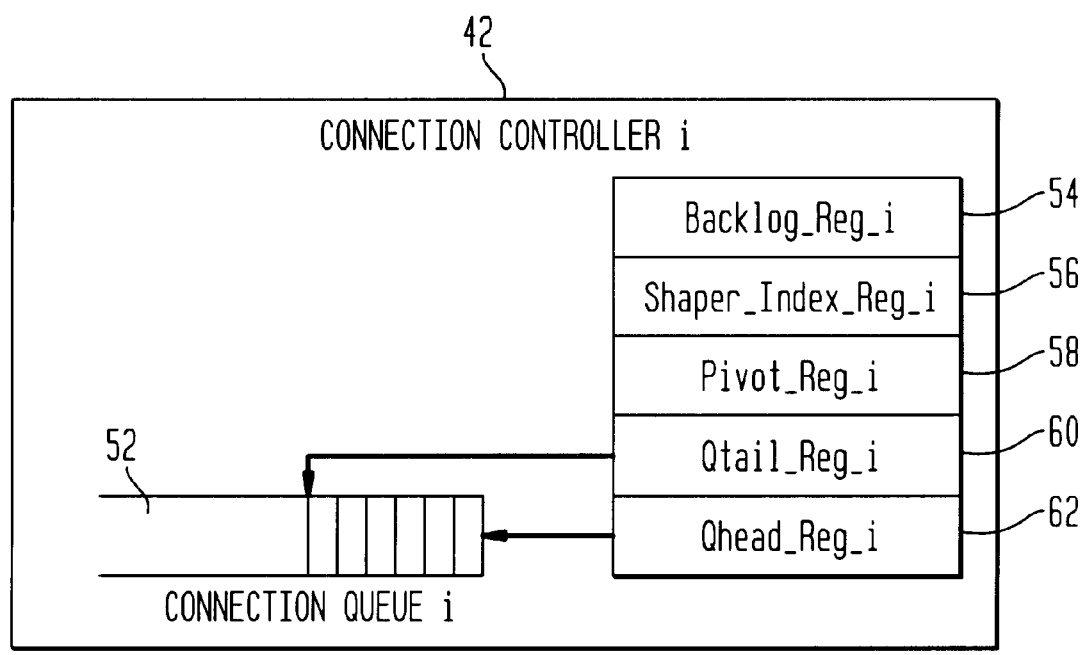
FIG. 6 is a block diagram of the connection controller that is part of the communication link interface of FIG. 5.

FIG. 6 illustrates one preferred embodiment of each connection controller 42 of FIG. 5 for a connection i according to the current invention. In other words, for each connection, the same structure is duplicated. Each connection controller 42 includes the following:

(a) a connection queue 52, which is used to store the received data packets of connection i, with registers Qtail_Reg 60 and Qhead_Reg 62 containing pointers to the head and tail, respectively, of the connection queue 52, (b) a register Backlog_Reg 54, which indicates whether or not the connection is backlogged (i.e., has at least one packet in its queue), (c) a register Shaper_Index_Reg 56, which stores an index of the rate group to which the connection belongs, and (d) a register Pivot_Reg 58, which indicates whether or not the connection is a pivot (described below).

Figure 7:
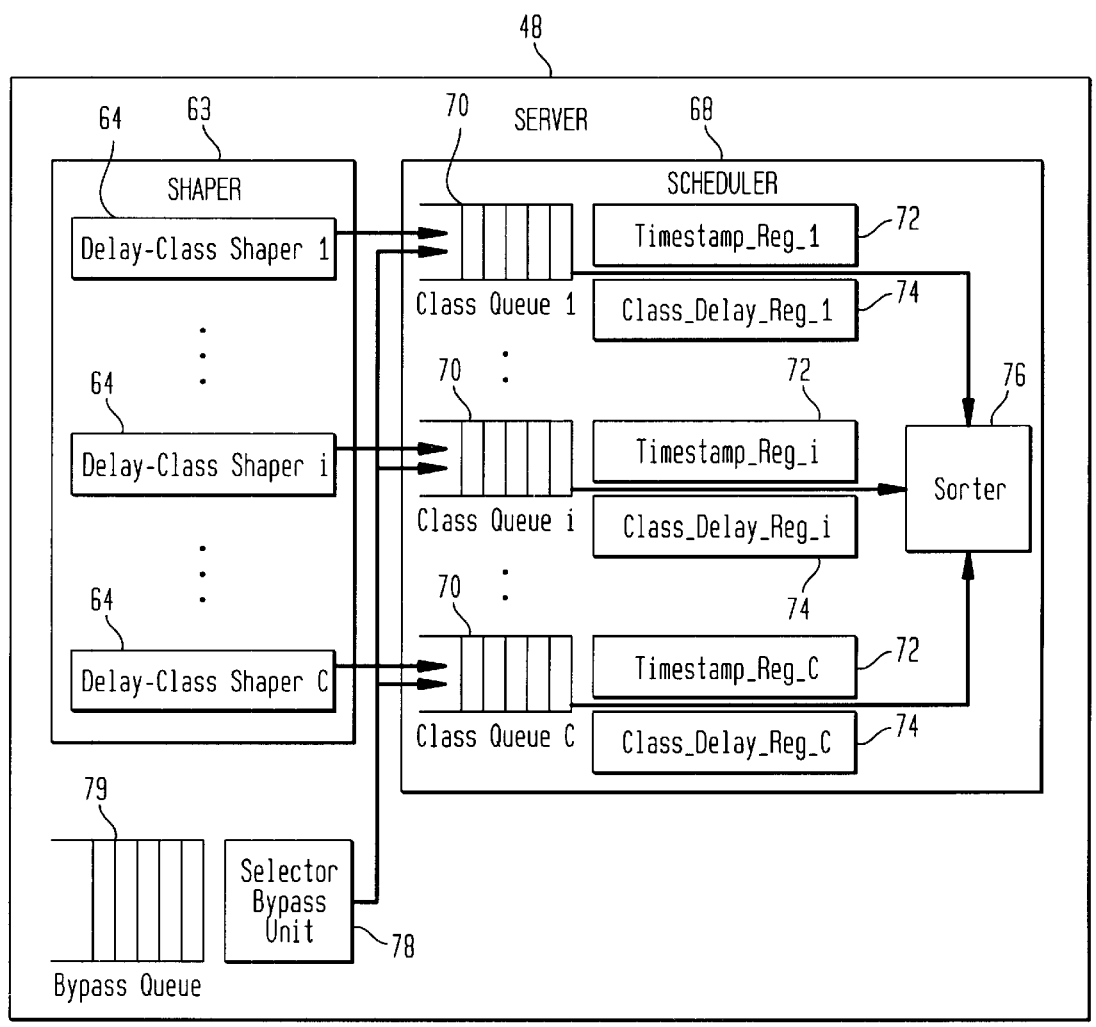
FIG. 7 is a block diagram of the server that is part of the communication link interface of FIG. 5.

FIG. 7 illustrates one preferred embodiment of the server 48 of FIG. 5 according to the current invention. In general, the server 48 groups connections into a discrete set of a relatively small, predetermined number C of delay classes. The server 48 includes at least two main components: a shaper 63 having C delay-class shapers 64 and a scheduler 68. Each delay class is associated with a delay value, and this delay value corresponds to the delay guarantee provided by the scheduler 68 to the packets of each connection in the delay class. The delay-class shapers 64 provide one scheduling structure per delay class.

Similarly, for each delay class, the scheduler 68 includes a class queue 70 for queuing data packets, a register Timestamp_Reg 72 for storing timestamp information, and a register Class_Delay_Reg 74 for storing guaranteed time-delay information. The server 48 also includes a sorter 76 for sorting the time-stamped information and a selector bypass unit 78 for inserting packet data from a bypass queue 79 into a corresponding class queue 70.

When a packet arrives for connection at an input communication link interface 24 of FIG. 4, the leaky-bucket processor 44 of FIG. 5 determines the shaping rate $r_i$ which is desired by the packet. Additionally, the delay-class and rate-group identifier 46 determines a delay class j as well as a rate class i. If the leaky-bucket computation reveals that the packet is to be directly sent to a scheduler and the connection has no backlog, then the packet is inserted into the bypass queue 79 of FIG. 7. The selector bypass unit 78 subsequently picks up the packet from the bypass queue 79 and inserts it at the tail of the appropriate class queue 70 in the scheduler 68. If, on the other hand, the leaky-bucket computation reveals that the packet is not to be released immediately, or if the connection is backlogged (i.e., the corresponding connection queue 52 of FIG. 6 is not empty), then the packet at the tail of the corresponding connection queue 52 is marked with a tag equal to i, and the incoming packet is inserted at the tail of the corresponding connection queue 52.

Figure 8:
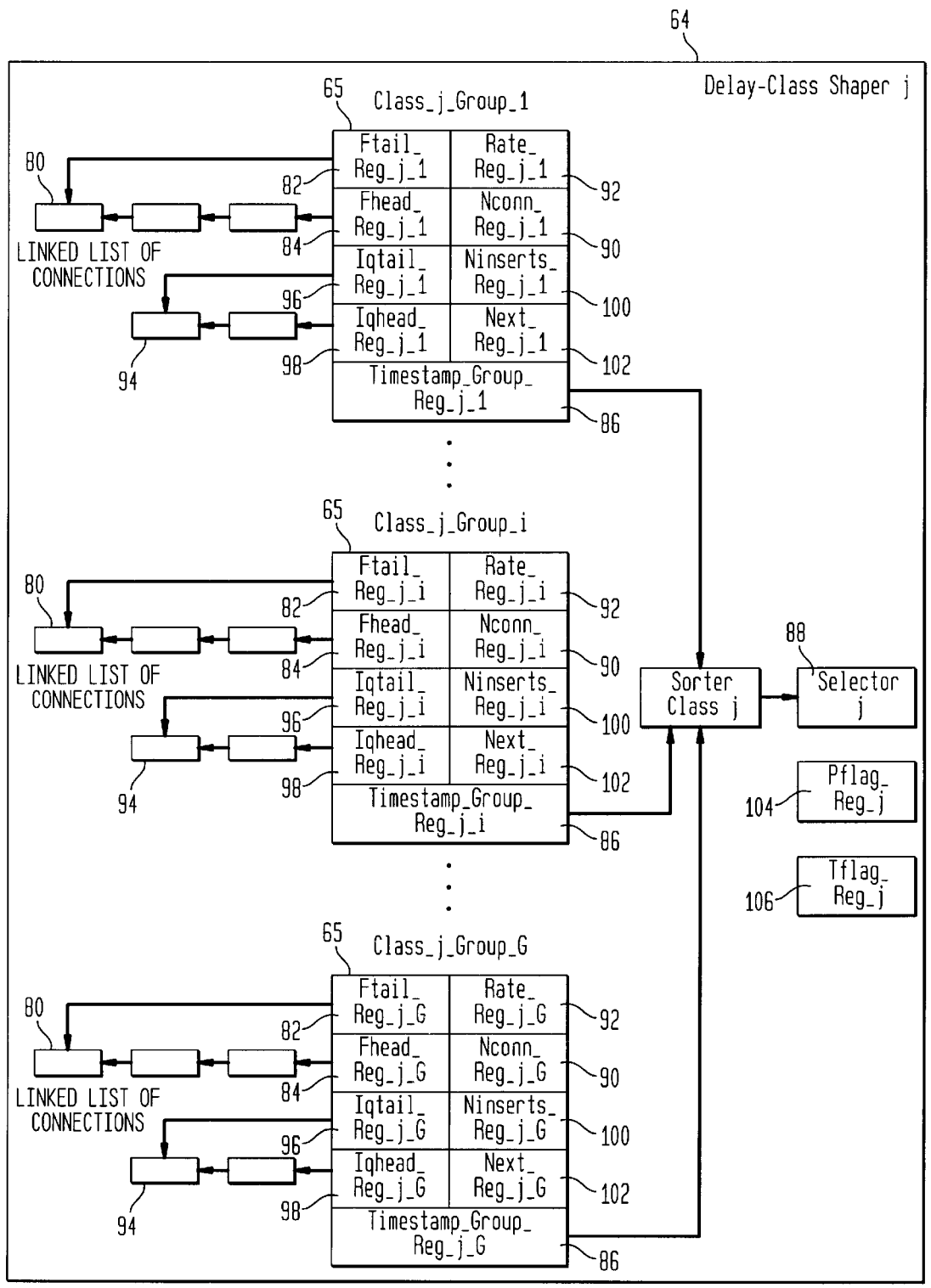
FIG. 8 is a block diagram of the delay class shaper that is part of the server of FIG. 7.

FIG. 8 illustrates one preferred embodiment of the structure of each delay-class shaper 64 of FIG. 7 according to the current invention. Each delay-class shaper 64 shapes all the connections in the corresponding delay class and supports a discrete number G of shaping rates $r_1$ through $r_G$. The total or overall rate at which each delay-class shaper 64 operates for releasing packets is equal to the link rate r. This is because the sum of the shaping rates of the connections in a delay class cannot exceed the link rate r. In the j-th delay-class shaper 64 shown in FIG. 8, the i-th shaping rate $r_i$ is associated with a corresponding rate group Class_j_Group_i 65. Connections belonging to delay class j that need to be shaped at the rate $r_i$ are queued in the FIFO_j_i 80, which corresponds to the rate group Class_j_Group_i 65, and the selection in the delay-class shaper j is performed only among connections at the head or top of FIFO_j_i 80, where i=1 through G. In this preferred embodiment, each of the FIFOs 80 is implemented as a link list and has a corresponding tail pointer stored in register Ftail_Reg 82 for indicating the end of the queue and a corresponding head pointer stored in register Fhead_Reg 84 for indicating the top of the queue.

A selector 88, located within delay-class shaper 64, selects, at each time slot of length L/r, which is equal to the transmission time of a packet from the FIFOs 80 corresponding to the rate groups within the corresponding delay class j, the connection at the head of a nonempty FIFO 80 that has the minimum eligible timestamp stored in the corresponding register Timestamp_Group_Reg 86 among all rate groups belonging to that delay class j. An eligible queue timestamp is defined to be one whose value is not greater than the current time. Every time a FIFO is selected and a packet is released from the queue of the connection at the head of the selected FIFO into the scheduler 68 of FIG. 7, the corresponding timestamp stored in Timestamp_Group_Reg 86 of FIG. 8 is incremented by $L/n_{ji} r_i$, where L is the packet length, $n_{ji}$ is the number of connections queued in FIFO_J_i, and $r_i$ is the rate corresponding to the rate group. The number of connections $n_{ji}$ is stored in a corresponding register Nconn_Reg_j_i 90, while the rate $r_i$ is stored in the register Rate_Reg_j_i 92. If the connection that has been selected remains backlogged and requires the same service rate $r_i$ as indicated by the tag associated with the packet, then the packet is reinserted at the tail of FIFO_j_i 80.

Each connection is shaped according to a piecewise-linear shaping envelope, which is the combination of one or more leaky-bucket envelopes as disclosed in R. Cruz, "A Calculus for Network Delay, Part II: Network Analysis," *IEEE Transactions on Information Theory*, pp. 121–141, January 1991, and each of the leaky-bucket envelopes is associated with a corresponding shaping rate. Because the shaping envelopes for the connections are piecewise-linear functions, the desired shaping rate may change while a connection is backlogged. Consequently, a connection that is queued in a given FIFO corresponding to a particular rate group in a delay-class shaper may, once served, have to be queued in a different FIFO corresponding to a different rate group within the same delay-class shaper. Such an occurrence is referred to as a rate jump. These jumps are computed and stored, preferably within a tag portion of the packet by the leaky-bucket processor 44 of FIG. 5.

To account for the variations in rate or rate jumps experienced by backlogged connections, the concept of a pivot connection is introduced to each of the rate groups having a nonempty FIFO_j_i 80 of FIG. 8. Every nonempty FIFO_j_i 80 has one of its connections marked as a pivot, and a corresponding flag is stored by each connection controller 42 of FIG. 5 in a corresponding register Pivot_Reg 58 of FIG. 6. Consecutive appearances of the pivot at the head of a FIFO_j_i 80 are separated by a $L/r_i$ difference in the values in register Timestamp_Group_Reg 86 of FIG. 8. Connections that are to be inserted into a nonempty FIFO_j_i 80 either by virtue of a rate jump or by becoming newly backlogged are stored in an auxiliary queue Insertq_j_i 94 of FIG. 8. Registers Iqhead_Reg 98 and Iqtail_Reg 96 store pointers to the head and tail, respectively, of the corresponding auxiliary queue. The number of such connections in the auxiliary queue Insertq_j_i 94 are stored in the register Ninserts_Reg_j_i 100. Insertq_j_i 94 is appended to FIFO_j_i 80 when the pivot makes an appearance at the head of FIFO_j_i 80. Simultaneously, the register Nconn_Reg 90 is updated using the value stored in register Next_Reg 102, which accounts for deletions from FIFO_j_i 80 and the register Ninserts_Reg 100.

To properly cope with a change in the shaping rate among connections, a rate jump is performed only from a higher rate to a lower rate within a busy period for the connection. That is, a busy period is when the connection is continuously backlogged. If a packet for a connection arrives at the server while the connection is still backlogged and requests a shaping rate that is higher than the shaping rate requested by the previous packet for that connection, the connection continues to be served at the lower rate. However, a packet arriving to a non-backlogged connection is inserted in the shaping FIFO queue corresponding to its requested shaping rate, irrespective of whether or not the previous packet of the connection was served at a lower rate. The rationale behind this is justified by the observation that, in an ideal shaper, a connection with a leaky-bucket traffic envelope never increases its shaping rate while it is still backlogged.

The following tables summarize the various blocks and structures as shown in FIGS. 5–10.

| Delay-Class Shaper j 64 of FIGS. 7 and 8: | |
|---|---|
| Timestamp_Group_Reg_j_g | Timestamp for Class j, Group g |
| Rate_Reg_j_g | Rate at which Class j, Group g shapes |
| Nconn_Reg_j_g | Number of connections in Class j, Group g |
| FIFO_j_g | FIFO of connections in Class j, Group g (Fhead_Reg_j_g and Ftail_Reg_j_g contain pointers to the head and tail, respectively) |
| Insertq_j_g | Queue of connections waiting for insertion in Class j, Group g FIFO (Iqhead_Reg_j_g and Iqtail_Reg_j_g contain pointers to the head and tail, respectively) |
| Ninserts_Reg_j_g | Number of connections in insertion queue |
| Next_Reg_j_g | Number of connections in FIFO for next round |
| Pflag_Reg_j | Register for temporary storage of pivot flag |
| Tflag_Reg_j | Register for temporary storage of packet tag |
| Bypass Queue | Queue of packets which bypass the shaper |
| Connection Controller i 42 of FIGS. 5 and 6: | |
| Connection Queue i | Connection i packet queue (Qhead_Reg_i and Qtail_Reg_i contain pointers to head and tail, respectively) |
| Backlog_Reg_i | Indicates if connection is backlogged |
| Shaper_Index_Reg_i | Index of rate group to which connection currently belongs |
| Pivot_Reg_i | Indicates if connection is pivot |
| Scheduler 68 of FIG. 7: | |
| Class_Delay_Reg_i | Delay associated with Class i |
| Timestamp_Reg_i | Timestamp for Class i |
| Packet: | |
| tag (in shaper) | Indicates shaping rate of next packet of the connection |
| tag (in scheduler) | Timestamp by which the packet has to be served |

Figure 9A:
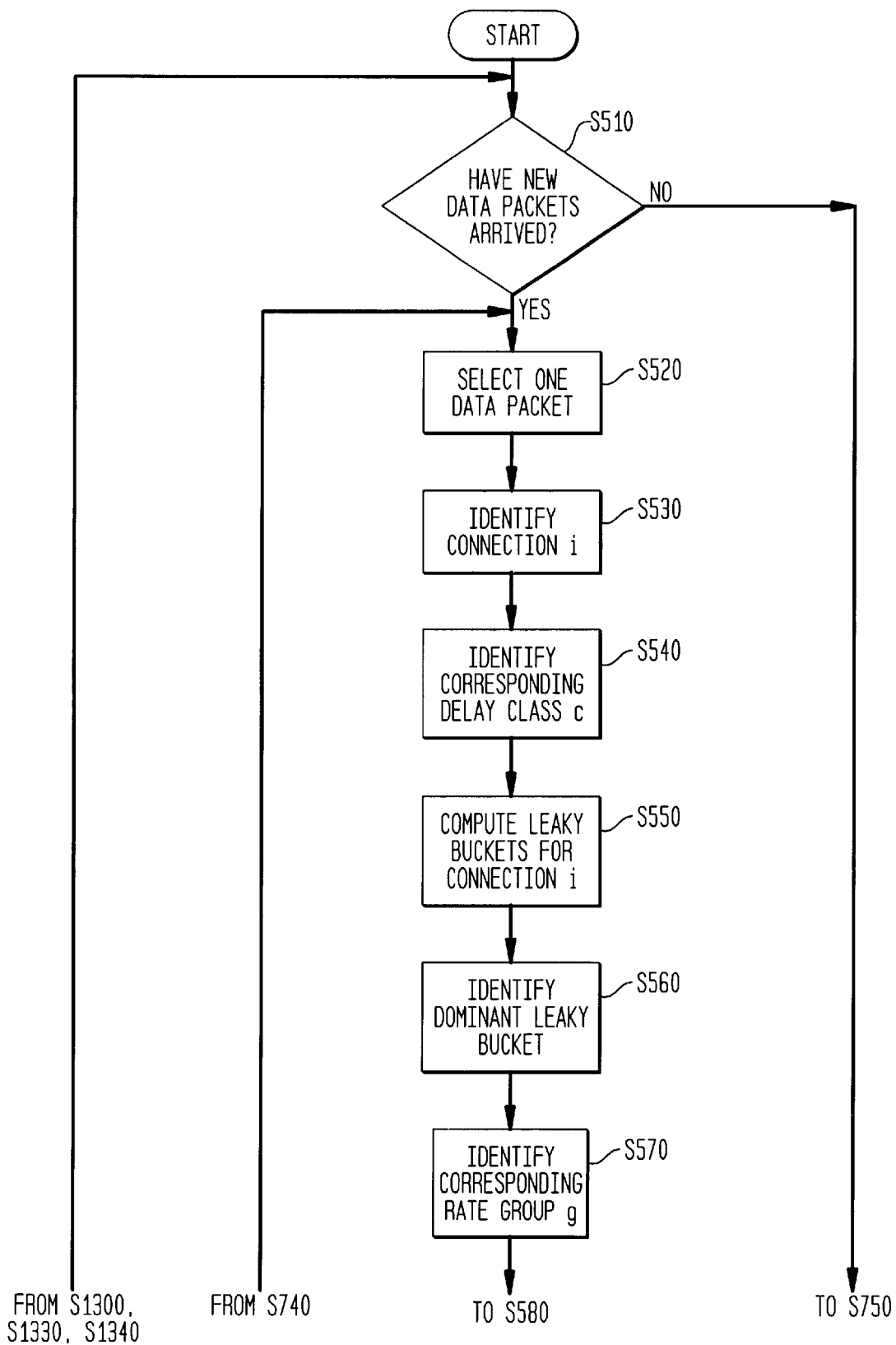
FIGS. 9A–9G show in flowchart form a first method of scheduling the transmission of data packets in a communication link interface of FIG. 5 in accordance with the principles of the present invention.

FIGS. 9A–9G show steps involved in a preferred process according to the current invention. Referring first to FIG. 9A, following the arrival of packets in step S510, one data packet is selected in step S520. A connection i and a corresponding delay class c are identified, respectively, in steps S530 and S540. Leaky-bucket computation is performed by leaky-bucket processor 44 of FIG. 5 in step S550 so as to determine a dominant leaky bucket in step S560 and a shaping rate g desired by the packet in step S570. If, on the other hand, no packet arrives at step S510, the process proceeds to step S750 in FIG. 9C, which is described below.

Figure 9B:
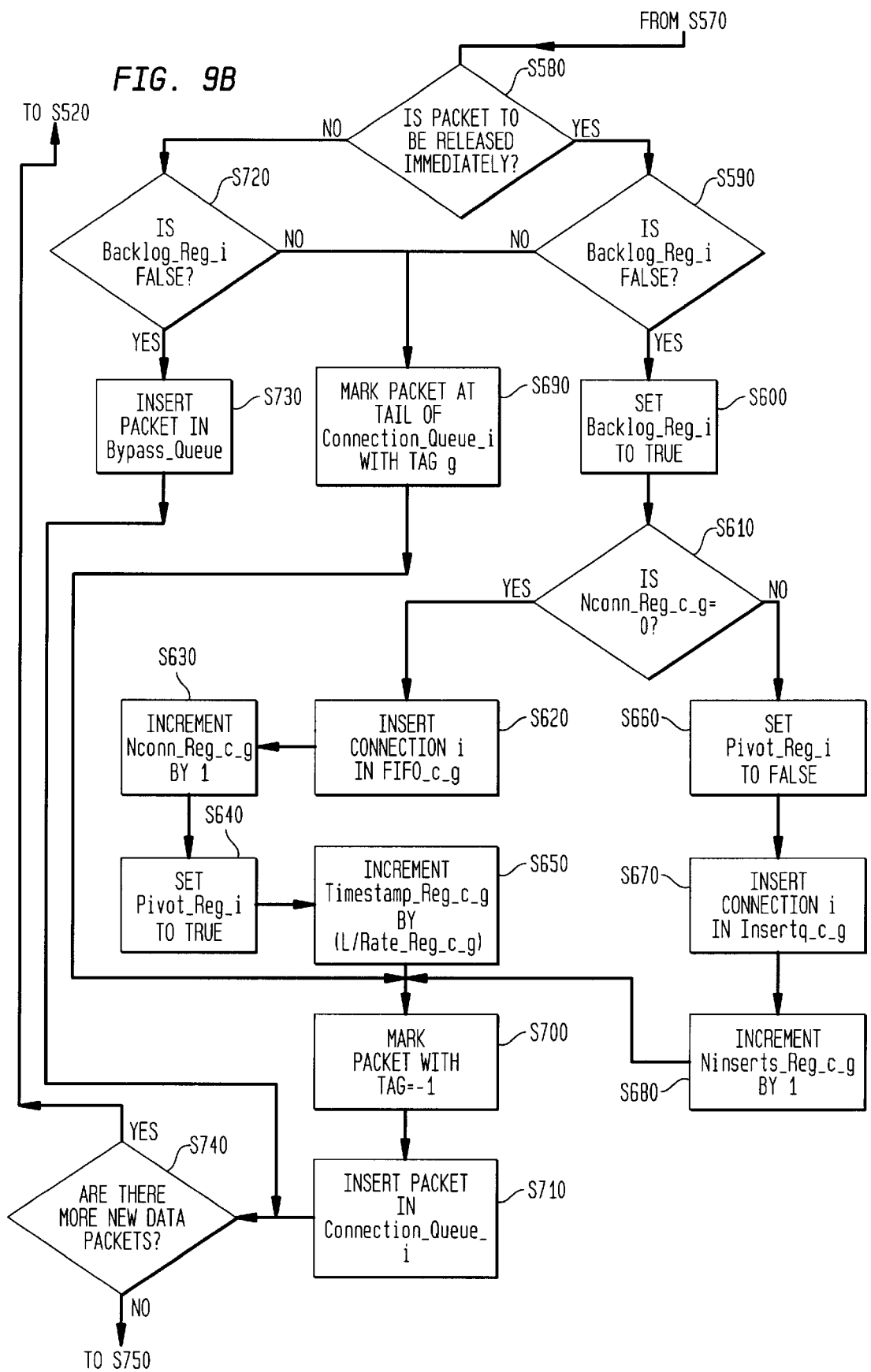

Now referring to FIG. 9B, when the connection is selected by the selector 88 of FIG. 8 in the corresponding delay-class shaper 64 of FIG. 7 or by the selector bypass unit 78 of FIG. 7, the packet at the head of the connection's queue is to be immediately released to the scheduler 68 of FIG. 7 in step S580. If so, it is determined whether or not any connection is backlogged based upon the value in register Backlog_Reg_i 54 of FIG. 6 in step S590. Upon confirming a FALSE value, the register Backlog_Reg_j 54 is now set to TRUE in step S600, and the number of connections in FIFO_c_g 80 of FIG. 8 of the delay class c and the rate g is examined using the stored value in the register Nconn_Reg_c_g 90 of FIG. 8 in step S610. If the number of connections in FIFO_c_g as stored in the register Nconn_Reg_c_g 90 is not zero, the register Pivot_Reg_i 58 of FIG. 6 is set to FALSE in step S660 and the connection i is inserted into the auxiliary queue Insertq_c_g 94 of FIG. 8 in step S670. Consequently, the value of the register Ninserts_Reg_c_g 90 of FIG. 8 is incremented by one in step S680. After the packet is marked with TAG=−1 in step S700, the packet is inserted in connection queue i 52 of FIG. 6 in step S710. Lastly, it is checked whether or not there remains more new data packets in step S740. If data packets remain, the process goes back to step S520 to process another data packet. The process proceeds to step S750 if no new data packets are available.

On the other hand, if the number of connections in the FIFO is zero in step S610, the connection i is inserted in the FIFO_c_g 80 in step S620. Consequently, the value of the register Nconn_Reg_c_g 90 is incremented by one in step S630, and the register Pivot_Reg_i 58 of FIG. 6 is set to TRUE in step S640. The value stored in register Timestamp_Reg_c_g 72 of FIG. 7 is incremented in step S650 by a value L/Rate_Reg_c_g, where L is the packet length and the register Rate_Reg_c_g 92 of FIG. 8 contains the corresponding rate value, and processing proceeds to step S700.

Still referring to FIG. 9B, if the packet is not to be immediately released in step S580 and the register Backlog_Reg_i 54 of FIG. 6 indicates no backlog in step S720, the packet is inserted into the bypass queue 79 of FIG. 7 in step S730, and the process proceeds to step S740. On the other hand, if the register Backlog_Reg_i 54 indicates some backlog in step S720, the packet at the tail of connection queue i 52 of FIG. 6 is marked with TAG g in step S690. Step S690 is also performed after it has been determined that the packet is to be immediately released in step S580 if the register Backlog_Reg_i 54 in step S590 indicates some backlog. In either case, after step S690, the process proceeds to step S700.

Figure 9C:
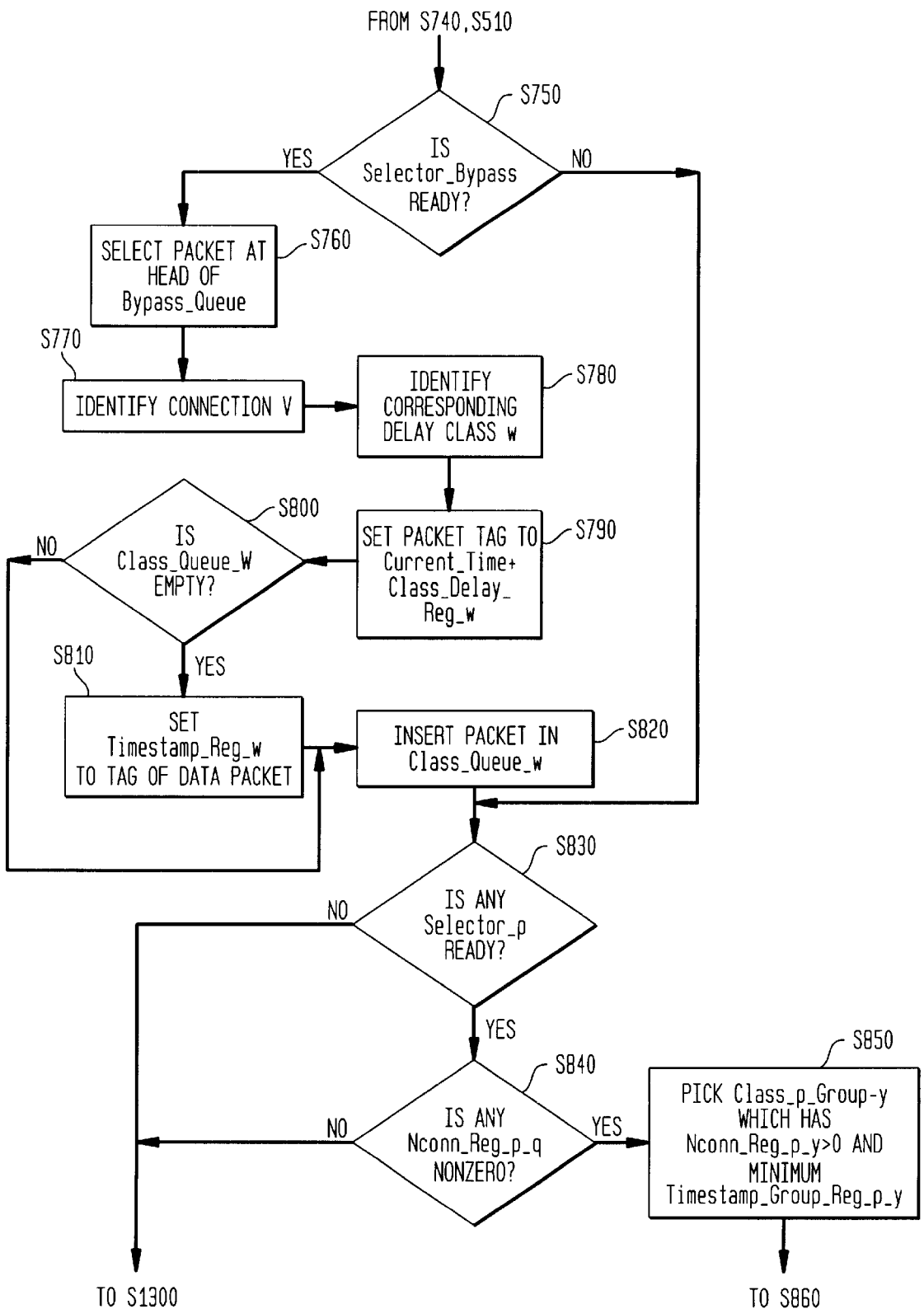

Now referring to FIG. 9C, steps related to the bypass queue 79 in FIG. 7 are illustrated according to the current invention. In step S750, it is determined whether or not the selector bypass unit 78 is ready. If it is not ready, the process skips to step S830. On the other hand, if the selector bypass unit 78 is ready, a packet at the head of the bypass queue 79 is selected in step S760. The connection v is identified in step S770, while a corresponding delay class w is identified in step S780. After the packet tag is set to the current time Current_Time+Class_Delay_Reg_w in step S790, it is determined whether or not the corresponding class queue w 70 of FIG. 7 is empty in step S800. If class queue w is empty, the register Timestamp_Reg_w 72 is set to a value contained in the TAG of the data packet in step S810, and the process proceeds to step S820 where the data packet is inserted into class queue w 70. On the other hand, if class queue w is not empty in step S800, the process proceeds directly to step S820. Following the insertion, if any selector p 80 of FIG. 8 is ready in step S830 and any register Nconn_Reg_p_q 90 contains a non-zero value in step S840, then the Class_p_Group_y 65 which has a value in register Nconn_Reg_p_y 90 greater than 0 and the smallest value in register Timestamp_Group_Reg_p_y 86 is selected in step S850, and the process proceeds to step S860. If either or both of the above two conditions as set forth in steps S830 and S840 are not met, the process skips to step S1300.

Figure 9D:
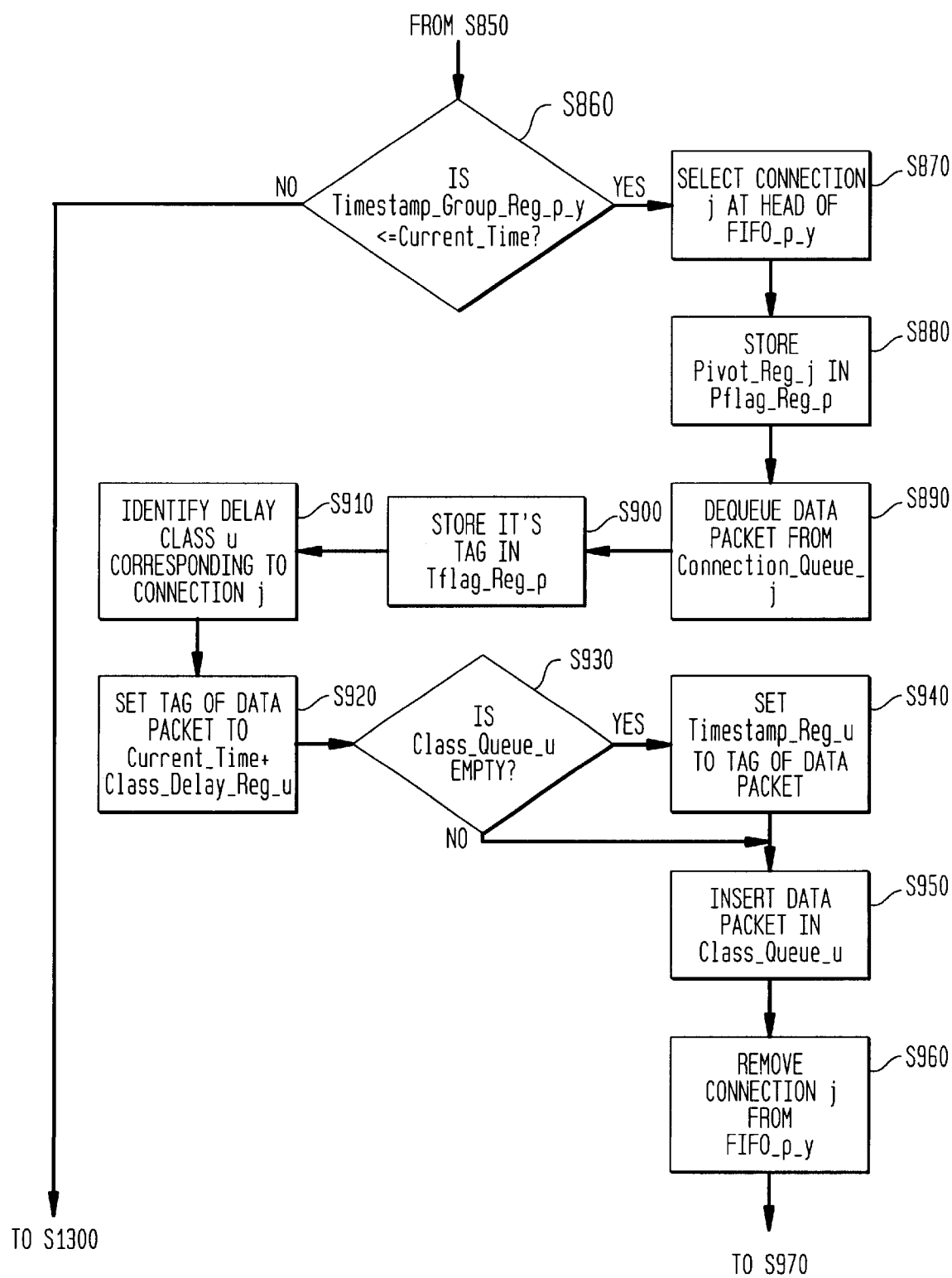

Referring to FIG. 9D, the connection as specified by Class_p_Group_y 64 of FIG. 8 and selected in the above step S850 is processed as follows. In step S860, it is determined whether or not the value stored in the register Timestamp_Group_Reg_p_y 86 is smaller than or equal to the current time Current_Time. If it is not, then the process proceeds to step S1300. On the other hand, if the value in the register Timestamp_Group_Reg_p_y 86 is smaller than or equal to the current time Current_Time in step S860, a connection j at the top of the queue FIFO_p_y 80 is selected in step S870, and the value in the register Pivot_Reg_j 58 of FIG. 6 is stored in the flag register Pflag_Reg_p 104 of FIG. 8 in step S880. The corresponding data packet is removed from the connection queue j 52 of FIG. 6 in step S890. After the dequeuing, a value in the corresponding TAG is also stored in the flag register Tflag_Reg_p 106 of FIG. 8 in step S900. Furthermore, a delay class u for the corresponding connection j is identified in step S910, and the TAG of the data packet is set to a value equal to Current_Time+Class_Delay_Reg_u 74 of FIG. 7 in step S920. When the class queue u 70 is empty as determined in step S930, the register Timestamp_Reg_u 72 is set to the TAG of the data packet in step S940. Otherwise, the process proceeds to step S950, where the data packet is inserted into class queue u 70. Lastly, the connection j is removed from the FIFO_p_y 80 of FIG. 8 in step S960.

Figure 9E:
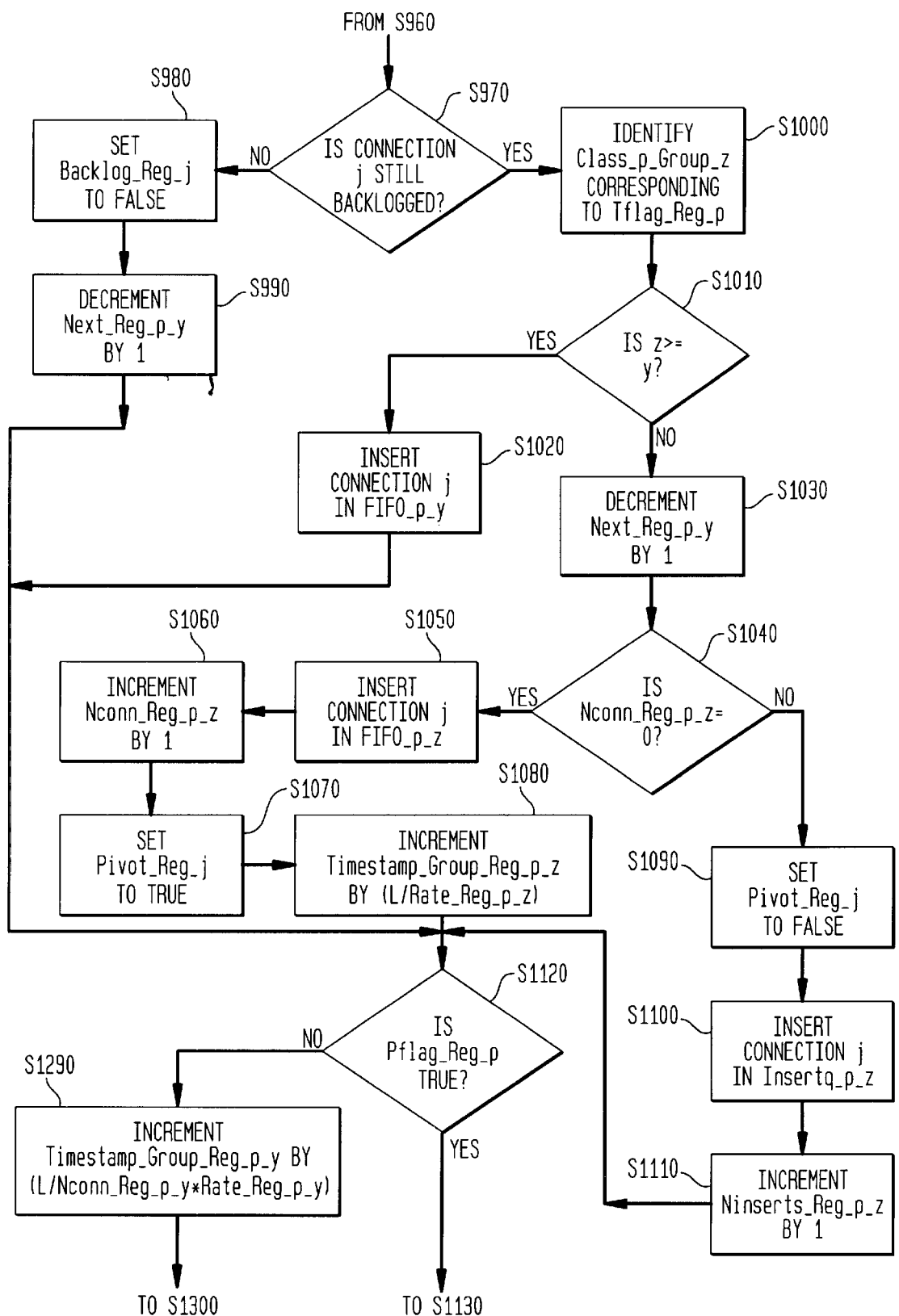

Referring to FIG. 9E, additional steps are taken to handle a backlog situation. It is determined whether or not the connection j is backlogged in step S970. If connection j is not backlogged, then register Backlog_Reg_j 54 of FIG. 6 is set to a FALSE value in step S980, the value in register Next_Reg_p_y 102 of FIG. 8 is decremented by one in step S990, and processing proceeds to step S1120. Upon confirming the backlog in step S970, the delay class and rate group corresponding to the register Tflag_Reg_p 106 are used to identify Class_p_Group_z 65 in step S1000. If the rate z is equal to or greater than the group rate y in step S1010, the connection j is inserted in FIFO_p_y 80 in step S1020, and the process proceeds to step S1120.

On the other hand, if the rate z is less than the group rate y in step S1010, then the value in register Next_Reg_p_y 102 is decremented by one in step S1030. If it is determined in step S1040 that the register Nconn_Reg_p_z 90 stores a zero value, the connection j is inserted into FIFO_p_z 80 in step S1050 and the value in register Nconn_Reg_p_z 90 is incremented by one in step S1060. Subsequently, the register Pivot_Reg_j 58 of FIG. 6 is set to a TRUE value in step S1070, while the value in register Timestamp_Group_Reg_p_z 86 is incremented by (L/Rate_Reg_p_z), where L is the packet length, in step S1080, and processing proceeds to step S1120.

On the other hand, in step S1040, if the register Nconn_Reg_p_z 90 does not contain a zero value, the register Pivot_Reg_j 58 of FIG. 6 is set to a FALSE value in step S1090, and the connection j is inserted into Insertq_p_z 94 in step S1100. Lastly, the value in register Ninserts_Reg_p_z 100 is incremented by one in step S1110.

If the register Pflag_Reg_p 104 contains a TRUE value in step S1120, the process proceeds to step S1130. On the other hand, if the register Pflag_Reg_p 104 does not contain a TRUE value, then the register Timestamp_Group_Reg_p_y 86 is incremented by (L/Nconn_Reg_$p_{13}$_y*Rate_Reg_p_y) in step S1290, and the process proceeds to step S1300.

Figure 9F:
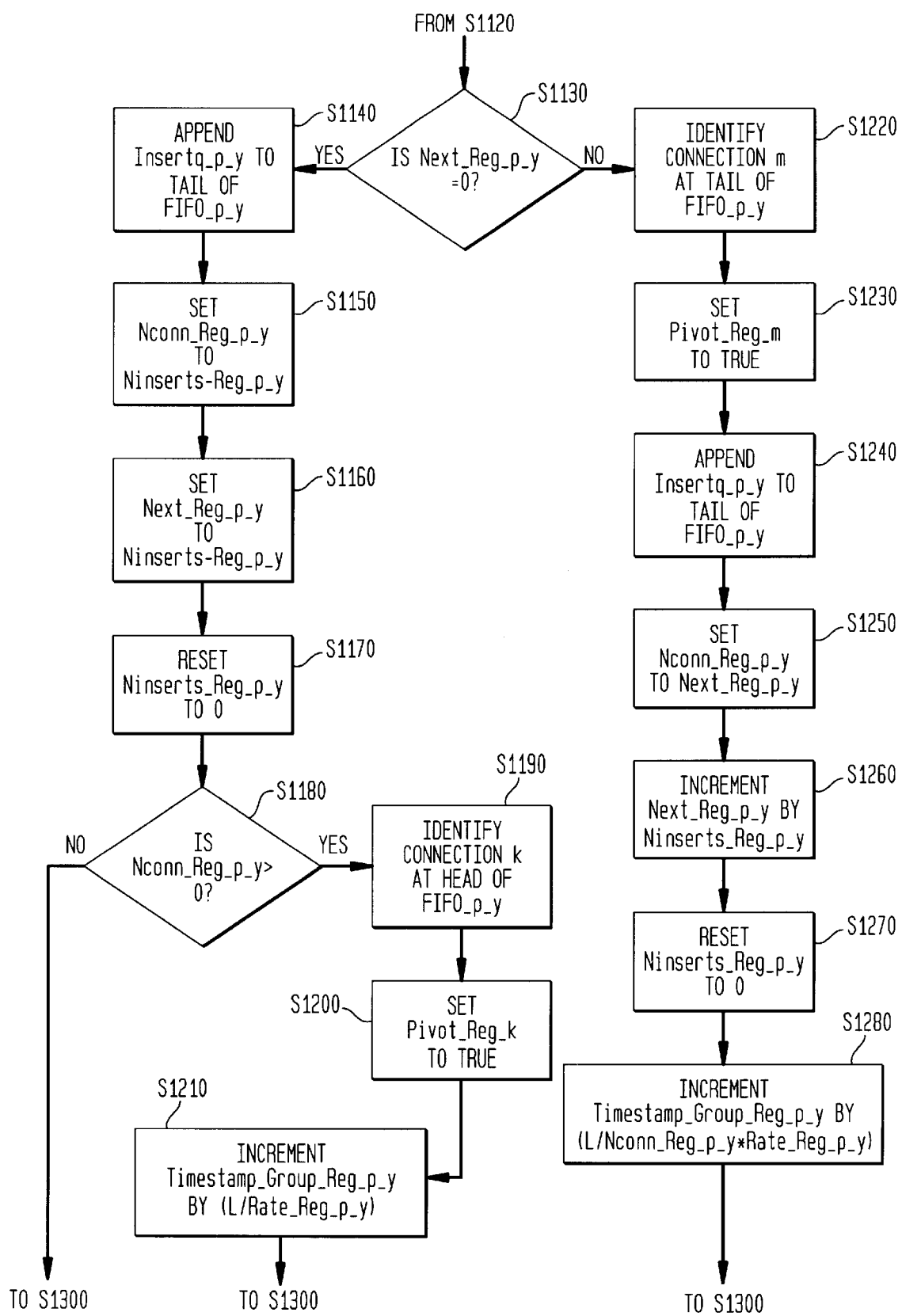

Now referring to FIG. 9F, steps related to the register Next_Reg_p_y 102 of FIG. 8 are handled. If the value in register Next_Reg_p_y 102 is not zero in step S1130, a connection m at the tail of FIFO_p_y 80 is identified in step S1220, and the value in the corresponding register Pivot_Reg_m 58 of FIG. 6 is set to TRUE in step S1230. Insertq_p_y 94 of FIG. 8 is appended to the tail of FIFO_p_y 80 in step S1240, while the register Nconn_Reg_p_y 90 is set to the value in register Next_Reg_p_y 102 in step S1250. The value in register Next_Reg_p_y 102 is incremented by the value in register Ninserts_Reg_p_100 in step S1260, and the register Ninserts_Reg_p_y 100 is reset to zero in step S1270. Lastly, the value in register Timestamp_Group_Reg_p_y 86 is incremented by (L/Nconn_Reg_$p_{y*Rate}$_Reg_p_y) in step S1280, and the process proceeds to step S1300.

On the other hand, if the value in register Next_Reg_p_y 102 is zero in step S1130, Insertq_p_y 94 is appended to the tail of FIFO_p_y 80 in step S1140, while the value in register Nconn_Reg_p_y 90 is set to the value in register Ninserts_Reg_p_y 100 in step S1150, the value in register Next_Reg_p_y 102 is set to the value in register Ninserts_Reg_p_y 100 in step S1160, and the register Ninserts_Reg_p_y 100 is reset to zero in step S1170. Subsequently, it is determined in step S1180 whether or not the value in register Nconn_Reg_p_y 90 is larger than zero. If not, the process proceeds to step S1300. On the other hand, if the value in register Nconn_Reg_p_y 90 is larger than zero, a connection k at the head of FIFO_p_y 90 is identified in step S1190, and the corresponding register Pivot_Reg_k 58 of FIG. 6 is set to TRUE in step S1200. Lastly, the value in register Timestamp_Group_Reg_p_y 86 of FIG. 8 is incremented by (L/Rate_Reg_p_y) in step S1210 before proceeding to step S1300.

Figure 9G:
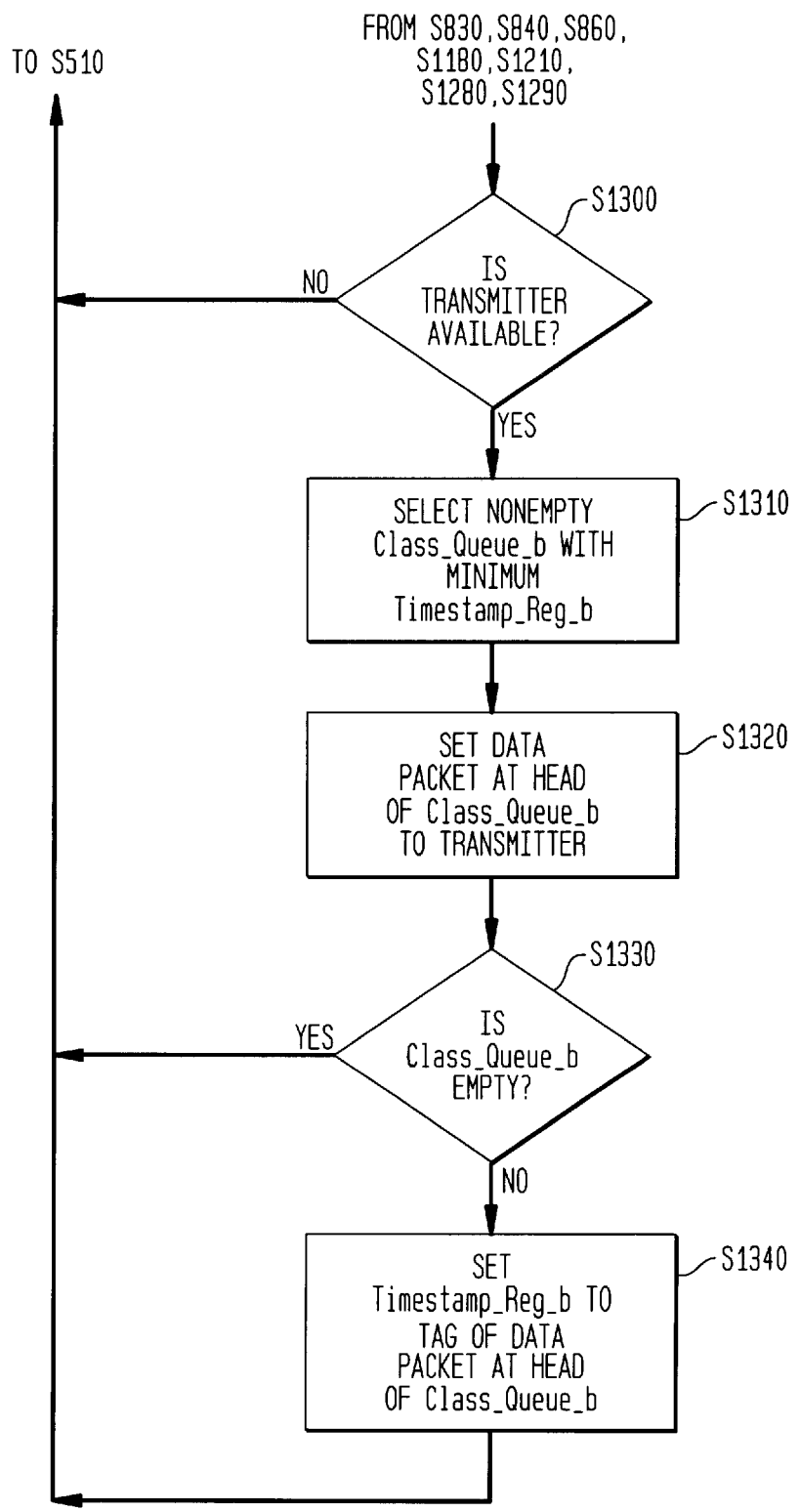

Referring to FIG. 9G, a data packet is sent via transmitter 50 of FIG. 5 in the following steps. In step S1300, it is determined whether or not transmitter 50 is available. If it is not available, the process returns to step S510. On the other hand, if the transmitter is available in step S1300, the nonempty class queue b 70 of FIG. 7 with the smallest value in the corresponding register Timestamp_Reg_b 72 is selected in step S1310. The data packet at the head of the selected class queue b 70 is sent to transmitter 50 in step S1320. After sending the data packet, it is determined whether or not class queue b 70 is empty in step S1330. If it is already empty, the process returns to step S510. In case the queue is not yet empty, the value in register Timestamp_Reg_b 72 is set to the TAG value of the data packet at the head of class queue b 70 in step S1340 before returning to step S510.

In summary, a tag associated with the packet is used to determine whether or not the connection is to be jumped to a FIFO corresponding to a lower rate group. If so, it is inserted into the insertion queue corresponding to the new rate group. The insertion queue is appended to the FIFO corresponding to the new rate group only when the pivot corresponding to the new rate group has been selected by selector 88 of FIG. 8. If, on the other hand, the tag indicates that a rate jump is not required, and the connection is still backlogged, it is reinserted at the tail of the same FIFO. The scheduler 68 of FIG. 7 maintains a class queue 70 of packets for every delay class. Scheduling is only performed among packets at the head of the class queues 70. If connection i belongs to a particular delay class j, then every time a packet belonging to connection i enters the scheduler 68 (from the shaper 63 or via the selector bypass unit 78), it is assigned a timestamp ahead of the current time by the delay value associated with that delay class, and linked at the tail of the corresponding class queue j 70. Each delay queue is served in a first-in-first-out manner since all packets in the queue have identical delay constraints. At each decision instant, the scheduler 68 selects the packet with the minimum timestamp among the packets at the head of each class queue 70. This timestamp value is stored in the corresponding register Timestamp_Reg 72, and the sorting of the C timestamps is accomplished by the sorter 76 within the scheduler 68.

Figure 10:
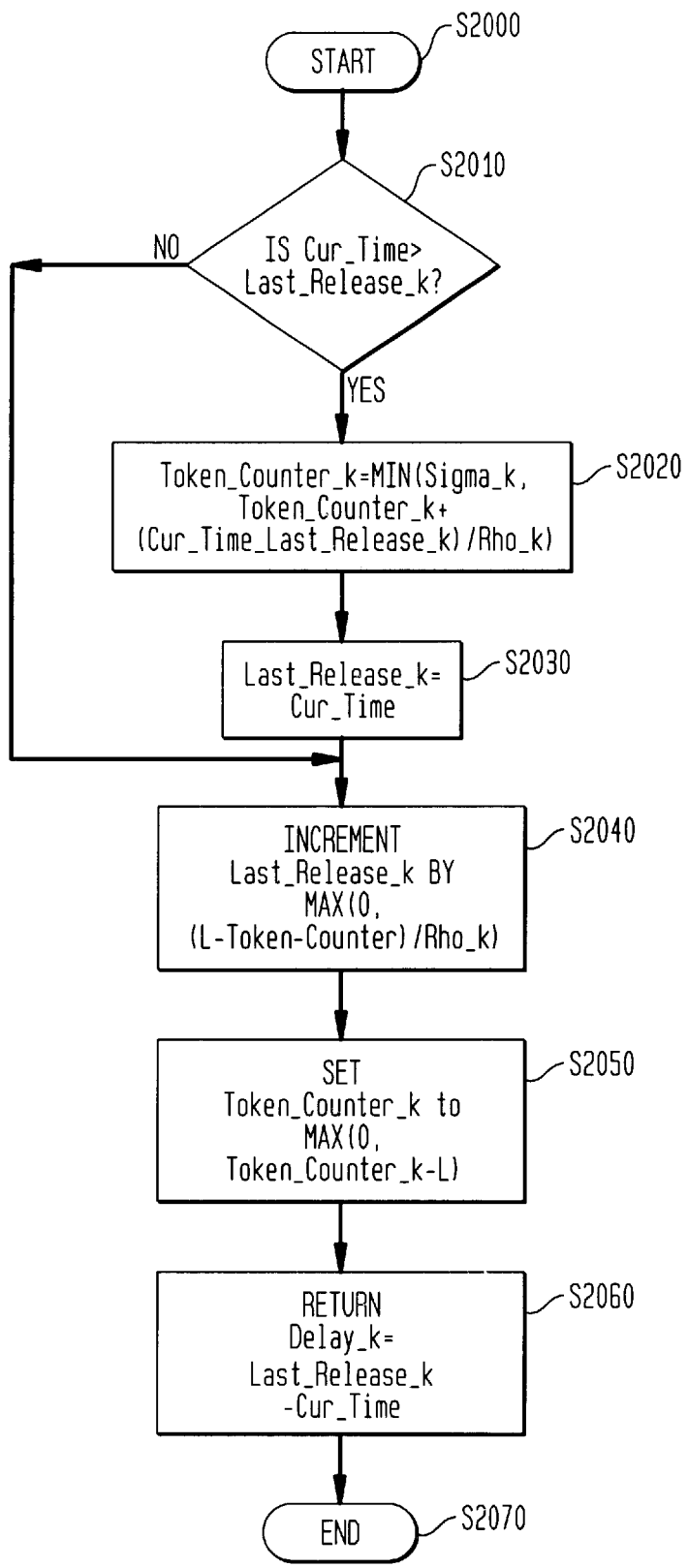
FIG. 10 shows in flowchart form a method of computing the release time of an incoming packet by a leaky bucket in accordance with the principles of the present invention.

FIG. 10 shows in flowchart form the computation of the delay incurred by an incoming packet in leaky bucket k. The leaky buckets together define the envelope on the connection's traffic. Registers Sigma_k and Rho_k hold the token bucket size and release rate, respectively, for the leaky bucket, while register Last_Release_k denotes the release time for the last packet and register Token_Counter_k denotes the current token count. In step S2010, it is determined whether or not the current time Cur_Time is larger than the value in register Last_Release_k. If it is not true, the process proceeds to step S2040. Otherwise, in step S2020, the value in register Token_Counter_k is determined, and, in step S2030, the register Last_Release_k is updated to the current time. Subsequently, in step S2040, the register Last_Release_k is incremented by MAX (0, (L-Token_Counter)/Rho_k). After the register Token_Counter_k is set to MAX (0, Token_Counter_k-L) in step S2050, the delay incurred by the packet is returned in the register Delay_k in step S2060. The overall delay incurred by the packet in the system of multiple leaky buckets (which together describe the envelope for the connection) is obtained as the maximum of the delays incurred in the individual leaky buckets, and this maximizing leaky bucket also determines the shaping rate and hence the rate group associated with the packet.

In the above, although the operation of the shaper has been described in the context of the implementation of an RC-EDF server, similar principles may be used in the implementation of shapers for other scheduling disciplines, wherein the shaping rates supported by the shaper are a discrete number, such as the disciplines described in F. M. Chiussi, A. Francini and J. G. Kneuer, "Implementing Fair Queueing in ATM Switches—Part 2: The Logarithmic Calendar Queue," *Proc. GLOBECOM'97*, pp. 519–525, November 1997; J. C. R. Bennett, D. C. Stephens and H. Zhang, "High Speed, Scalable, and Accurate Implementation of Fair Queueing Algorithms in ATM Networks," *Proc. ICNP'97*, pp. 7–14, October 1997.

In accordance with another aspect of the invention, the embodiments are identical to the first aspect described above except that rate jumps are handled differently. To be more specific, rate jumps are still performed only from a higher rate to a lower rate. However, if a packet for a connection arrives at the server while the connection is still backlogged and requests a shaping rate that is higher than the shaping rate requested by the previous packet for that connection, the connection is treated as newly backlogged and immediately queued into the FIFO corresponding to the new rate group. This implies that, at any given time, a connection may be waiting in more than one FIFO.

This aspect of the invention requires some modifications in the embodiments of the first aspect of the invention. Within each connection controller 42 of FIG. 5, the register Shaper_Index_Reg 56 of FIG. 6 is replaced by a link list of virtual connections. Each element of this link list corresponds to an entry in the FIFOs corresponding to the rate groups, and holds the index of the rate group with which it is associated. Further, FIFO_j_i 80 of FIG. 8 can contain virtual connection entries in it. This structure enables a connection to be in multiple FIFOs at the same time by replicating into various virtual connections. The arrangement, though not explicitly described here, can nevertheless easily be devised from the principles stated above.

In one embodiment, the present invention is a system which services a plurality of queues associated with respective data connections in a packet communication network such that the system guarantees data transfer delays between the data source and the destination of the data connections. This is achieved in two stages: the first stage shapes the traffic of each connection such that it conforms to a pre-specified envelope, while the second stage associates timestamps with the packets released by the first stage and chooses for transmission from among them the one with the smallest timestamp. Both stages are associated with a discrete set of delays classes. The first stage employs one shaping structure per delay class. Each shaping structure in turn supports a discrete set of rates and employs a FIFO of connections per supported rate. A connection may move between FIFOs corresponding to different rates as its rate requirement changes. The second stage associates with each packet exiting the first stage a timestamp given by the exit time from the first stage and the delay class to which the connection belongs. A queue of packets is maintained per delay class, and the scheduler selects for transmission from among the packets at the head of the queues the one with the smallest timestamp.

In at least one embodiment, the present invention is a method for shaping the data traffic of a plurality of connections, the connections traversing an associated communication switch, each of the connections being associated with a respective set of shaping rates and a respective data transfer delay time, each of the shaping rates being one of a first predetermined number of supported shaping rates, and each of the data transfer delay times being one of a second predetermined number of supported delay time classes, each of the connections being further associated with respective queues containing data packets. The method comprises the steps of:

(1) identifying for each data packet received via a plurality of data links, the respective one of the connections and the associated one of the queues;

(2) storing each of the received data packets in the identified queue;

(3) computing for each of the received data packets the respective one of the shaping rates, and associating the computed shaping rate with the data packet;

(4) identifying for each of the received data packets the respective one of the delay time classes;

(5) associating a queue of connections with each connection wherein the associated queue of data packets has at least one data packet waiting therein, the queue of connections being associated with one of the supported delay time classes and one of the supported shaping rates, the queue of connections being associated with the delay time class and shaping rate associated with the packet at the head of the queue of data packets associated with the connection;

(6) associating a first timestamp with each queue of connections, including generating a new first timestamp each time a connection enters an empty queue of connections, wherein a system time is used in the generation of the new first timestamp;

(7) associating a cumulative service rate with each of the queues of connections, the cumulative service rate being used to generate the respective first timestamp associated with each of the queues of connections;

(8) selecting one of the first timestamps associated with the queues of connections associated with each delay time class which have at least one connection waiting for service therein, and identifying the connections at the head of the queue of connections associated with the selected first timestamps as the recipient of the next service, the service including the steps of removing a data packet from the head of the queue associated with the identified connections, and transmitting the data packets;

(9) determining if the queue of data packets associated with the serviced connection has data packets waiting therein, and storing the connection in the queue of connections associated with the delay time class and shaping rate associated with the packet at the head of the queue of data packets;

(10) determining if the queue of connections associated with the serviced connection has connections waiting therein, and computing a new first timestamp associated to the queue of connections using the associated cumulative service rate.

In at least one embodiment, the set of shaping rates associated with each of the connections identifies an associated traffic envelope.

In at least one embodiment, the shaping rates respectively correspond to a slope value corresponding to a piece of a piecewise linear envelope.

In at least one embodiment, the selected data packets are transmitted to an output.

In at least one embodiment, the queues of connections are first-in-first-out link lists.

In at least one embodiment, the cumulative service rate associated with each of the queues of connections is equal to the number of connections in that queue times the shaping rate corresponding to that queue.

In at least one embodiment, the cumulative service rate associated with each of the queues of connections is updated when a connection identified as pivot connection is served, the pivot connection being one of the connections in the queue of connections.

In at least one embodiment, the new first timestamp computed when a queue of connections is served and having data packets waiting therein is equal to the previous timestamp incremented by the length of the data packet at the head of the queue of data packets associated with the connection at the head of the queue of connections, divided by the cumulative service rate.

In at least one embodiment, a connection stored in a previously empty queue of connections is identified as the pivot connection.

In at least one embodiment, the connection stored after the pivot connection in the associated queue of connections at the time when the pivot connection is served and is not stored back in the queue of connection is declared as the new pivot connection.

In at least one embodiment, the invention further comprises a method of guaranteeing a delay time to each connection, said method comprising the steps of:

(a) associating a queue of data packets with each of the supported delay time classes;

(b) associating each served packet with a second timestamp equal to the system time plus the delay time associated with the corresponding connection, removing the packet from the queue of packets associated with the connection and storing the removed data packet to the tail of the queue of data packets associated with the delay time class; and (c) selecting one of the second timestamps associated with the data packets at the head of the queues associated with the delay time classes which have at least one packet waiting therein as the recipient of the next service, the service including the steps of removing the data packet from the head of the queue associated with the delay bound class of the selected timestamp, and transmitting the removed data packet to an output.

In at least one embodiment, the selected second timestamp is the minimum of the timestamp associated with the data packets at the head of the queues associated with the delay time classes which have at least one packet waiting therein.

The illustrative embodiments described above are but two examples of the principles that may be used to schedule the transmission of data packets according to the present invention. Those skilled in the art will be able to devise numerous arrangements, which, although not explicitly shown or described herein, nevertheless embody those principles that are within the spirit and scope of the present invention.

What is claimed is:

1. A method of shaping data traffic of one or more connections traversing a: switch, the method comprising the steps of:

a) determining a shaping rate and a transfer delay class for one or more data packets of a connection received at the switch;

b) enqueueing (i) each data packet of the connection in a data queue associated with one or more connections having the same shaping rate and transfer delay class as the data packet and(ii) the connection in a corresponding connection queue associated with one or more connections having the same shaping rate and transfer delay class as the data packet;

c) selecting for service, for a transfer delay class, a connection in a non-empty connection queue having the corresponding transfer delay class, based on a timestamp of the connection queue;

d) transmitting one or more data packets of the selected connection from the corresponding data queue;

e) dequeueing the selected connection from the connection queue; and f) enqueuing the dequeued connection back into the connection queue, if the dequeued connection has one or more remaining data packets in the corresponding data queue.

2. The method as recited in claim 1, further comprising the step of g) updating a cumulative service rate and a timestamp of the connection queue of the enqueued selected connection, wherein the timestamp for the connection queue is determined from the cumulative service rate of the queue and a system potential of the switch when a connection is enqueued in a corresponding connection queue that is empty.

3. The method as recited in claim 2, wherein, for step g), the cumulative service rate is updated for each service of a pivot connection enqueued in a corresponding connection queue.

4. The method as recited in claim 2, wherein, for step g), the cumulative service rate of the queue is related to a combination of i) a number of connections in the connection queue and ii) the corresponding shaping rate of the connection queue.

5. The method as recited in claim 2, wherein, for step g), the timestamp is updated when the connection queue is served and remains un-empty, and the updated timestamp is computed as i) the timestamp that is incremented by a length of the data packet at the head of the data queue associated with the connection at the head of the corresponding connection queue that is served, which incremented timestamp is then divided by the cumulative service rate.

6. The method as recited in claim 5, wherein a connection enqueued in a empty connection queue is a pivot connection, and a connection stored after the pivot connection is set as a new pivot connection if the pivot connection is dequeued and not enqueued after the pivot connection is served in step c).

7. The method as recited in claim 1, wherein, for step a), each shaping rate corresponds to a traffic envelope associated with data packets of a connection.

8. The method as recited in claim 1, wherein, for step a), each shaping rate corresponds to a value of slope for a segment of a piece-wise linear traffic envelope.

9. The method as recited in claim 1, wherein, for steps b) through f), each connection queue is a first-in, first-out linked list.

10. The method as recited in claim 1, further comprising the step of g) guaranteeing a delay time to each connection, step g) comprising the steps of:

g1) associating a data queue with each delay class, each data queue having data packets of a corresponding connection with the determined transfer delay class of step a);

g2) associating a second timestamp for each data queue for data packets of the connection serviced with steps c) and d) Wherein the second timestamp is set as a combination of the system potential and the delay time of the delay class associated with the serviced data packet;

g3) dequeuing the serviced data packet from the corresponding connection queue;

g4) enqueuing the service data packet at the tail of the data queue with the delay class equivalent to the delay class of the corresponding connection queue;

g5) selecting a data packet from one of the data queues based on the second timestamp; and g7) transmitting the selected data packet.

11. The method as recited in claim 10, wherein the selected second timestamp is a relative minimum timestamp of the non-empty connection queues, wherein each non-empty connection queue is a connection queue associated with the data packets at the head of the data queues.

12. Apparatus for shaping data traffic of one or more connections traversing a switch, the apparatus comprising:.

a shaper determining a shaping rate and a transfer delay class for one or more data packets of a connection received at the switch; and a server enqueueing (i) each data packet of the connection in a data queue associated with one or more connections having the same shaping rate and transfer delay class as the data packet and (ii) the connection in a corresponding connection queue associated with one or more connections having the same shaping rate and transfer delay class as the data packet, wherein the server i) selects for service, for a transfer delay class, a connection in a non-empty connection queue having the corresponding transfer delay class, based on a timestamp of the connection queue, and ii) causes one or more data packets of the selected connection to be transmitted from the corresponding data queue; and wherein the server 1) dequeues the selected connection from the connection queue; and 2) enqueues the dequeued connection back into the connection queue, if the dequeued connection has one or more remaining data packets in the corresponding data queue.

13. The apparatus as recited in claim 12, wherein the shaper updates a cumulative service rate and a timestamp of the connection queue of the enqueued selected connection, the timestamp for the connection queue determined from the cumulative service rate of the queue and a system potential of the switch when a connection is enqueued in a corresponding connection queue that is empty.

14. The apparatus as recited in claim 12, wherein the apparatus is embodied in either a switch or a router of a packet network.

15. A computer-readable medium having stored thereon a plurality of instructions, the plurality of instructions including instructions which, when executed by a processor, cause the processor to implement a method for shaping data traffic of one or more connections traversing a switch, the method comprising the steps of:

a) determining a shaping rate and a transfer delay class for one or more data packets of a connection received at the switch;

b) enqueueing (i) each data packet of the connection in a data queue associated with one or more connections having the same shaping rate and transfer delay class as the data packet and (ii) the connection in a corresponding connection queue associated with one or more connections having the same shaping rate and transfer delay class as the data packet;

c) selecting for service, for a transfer delay class, a connection in a non-empty connection queue having the corresponding transfer delay class, based on a timestamp of the connection queue;

d) transmitting one or more data packets of the selected connection from the corresponding data queue;

e) dequeueing the selected connection from the connection queue; and f) enqueuing the dequeued connection back into the connection queue, if the dequeued connection has one or more remaining data packets in the corresponding data queue.

* * * * *

UNITED STATES PATENT AND TRADEMARK OFFICE
CERTIFICATE OF CORRECTION

| | | |
|---|---|---|
| PATENT NO. | : 6,532,213 B1 | Page 1 of 2 |
| APPLICATION NO. | : 09/312253 | |
| DATED | : March 11, 2003 | |
| INVENTOR(S) | : Fabio M. Chiussi and Vijay Sivaraman | |

It is certified that error appears in the above-identified patent and that said Letters Patent is hereby corrected as shown below:

On the title page, in item [56] References Cited, please add:

--"VirtualClock: A New Traffic Control Algorithm for Packet-Switched Networks" by Lixia Zhang, ACM Transactions on Computer Systems, Vol. 9, No. 2, May 1991, pps. 101-124.

"A Generalized Processor Sharing Approach to Flow Control in Integrated Services Networks: The Single-Node Case" by Abhay K. Parekh and Robert G. Gallager, IEEE/ACM Transactions on Networking, Vol. 1, No. 3, June 1993, pps. 344-357.

"A Self-Clocked Fair Queueing Scheme for Broadband Applications" by S. Jamaloddin Golestani, 1994 IEEE, pps. 636-646.

"Efficient Fair-Queueing Algorithms for ATM and Packet Networks" by Dimitrios Stiliadis and Anujan Varma, UCSC-CRL-95-59, December 1995, pps. 1-24, Appendix A (4 pages), Appendix B (7 pages).

"Design and Analysis of Frame-based Fair Queueing: A New Traffic Scheduling Algorithm for Packet-Switched Networks" by Dimitrios Stiliadis and Anujan Varma: SIGMETRICS 96-5/96 Philadelphia, 1996 (12 pages).

"$WF^2Q$: Worst-case Fair Weighted Fair Queueing" by Jon C. R. Bennett and Hui Zhang, FORE Systems, School of Computer Science, Carnegie Mellon University (9 pages).

"Hierarchical Packet Fair Queueing Algorithms" by Jon C. R. Bennett and Hui Zhang, FORE Systems Inc., Carnegie Mellon University (14 pages).

"A General Methodology for Designing Efficient Traffic Scheduling and Shaping Algorithms" by Dimitrios Stiliadis and Anujan Varma, Bell Laboratories, Lucent Technologies, Computer Engineering, University of California (10 pages).

"High Speed, Scalable, and Accurate Implementation of Packet Fair Queueing Algorithms in ATM Networks" by Jon C. R. Bennett, Donpaul C. Stephens and Hui Zhang, FORE Systems, Carnegie Mellon University (8 pages).

UNITED STATES PATENT AND TRADEMARK OFFICE
CERTIFICATE OF CORRECTION

PATENT NO.        : 6,532,213 B1
APPLICATION NO.   : 09/312253
DATED             : March 11, 2003
INVENTOR(S)       : Fabio M. Chiussi and Vijay Sivaraman It is certified that error appears in the above-identified patent and that said Letters Patent is hereby corrected as shown below:

On the title page, in item [56] References Cited, please add: (cont'd)

"Implementing Fair Queueing in ATM Switches: The Discrete-Rate Approach" by Fabio M. Chiussi and Andrea Francini, High-Speed Networks Research Department, Bell Laboratories, Lucent Technologies (10 pages).--

Signed and Sealed this

Eleventh Day of September, 2007

JON W. DUDAS
*Director of the United States Patent and Trademark Office*